(12) United States Patent
Park et al.

(10) Patent No.: US 7,861,833 B2
(45) Date of Patent: Jan. 4, 2011

(54) DAMPER IN A WASHING MACHINE AND FABRICATING METHOD OF THE SAME

(75) Inventors: Seok Kvu Park, Changwon-si (KR); Gwan Ryong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 11/902,346

(22) Filed: Sep. 20, 2007

(65) Prior Publication Data

US 2008/0017461 A1 Jan. 24, 2008

Related U.S. Application Data

(62) Division of application No. 10/514,647, filed as application No. PCT/KR03/02521 on Nov. 21, 2003, now Pat. No. 7,281,614.

(51) Int. Cl.
*D06F 29/00* (2006.01)
*F16F 11/00* (2006.01)

(52) U.S. Cl. .......................... 188/381; 68/23.1; 188/266

(58) Field of Classification Search ................. 188/129, 188/266, 300, 322.15, 381; 68/23.1, 23 R; 267/120
See application file for complete search history.

(56) References Cited

U.S. PATENT DOCUMENTS

| 4,838,393 | A | | 6/1989 | Mourray et al. |
|---|---|---|---|---|
| 5,080,204 | A | * | 1/1992 | Bauer et al. .................. 188/129 |
| 5,085,297 | A | | 2/1992 | Bauer et al. |
| 5,257,680 | A | | 11/1993 | Corcoran et al. |
| 5,295,564 | A | | 3/1994 | Stadelmann |
| 5,549,182 | A | | 8/1996 | Ehrnsberger et al. |
| 5,823,306 | A | * | 10/1998 | de Molina .............. 188/322.15 |
| 5,878,851 | A | * | 3/1999 | Carlson et al. .............. 188/269 |
| 5,893,436 | A | * | 4/1999 | Guy ....................... 188/322.15 |
| 6,352,145 | B1 | * | 3/2002 | DeMolina et al. ........... 188/281 |
| 6,390,252 | B1 | * | 5/2002 | Namuduri et al. ........ 188/267.2 |
| 6,968,930 | B2 | | 11/2005 | Shibao |
| 2004/0148976 | A1 | | 8/2004 | Kim et al. |
| 2004/0261469 | A1 | | 12/2004 | Park et al. |
| 2005/0000765 | A1 | | 1/2005 | Park et al. |
| 2005/0188472 | A1 | * | 9/2005 | Park et al. ....................... 8/158 |
| 2008/0264744 | A1 | * | 10/2008 | Atwater et al. .............. 188/381 |

FOREIGN PATENT DOCUMENTS

| EP | 000702165 A2 | 3/1996 |
|---|---|---|
| EP | 001243685 A2 | 1/2002 |
| JP | 05-248468 A | 9/1993 |

(Continued)

*Primary Examiner*—Bradley T King
*Assistant Examiner*—Thomas Irvin
(74) *Attorney, Agent, or Firm*—Birch, Stewart, Kolasch & Birch, LLP

(57) ABSTRACT

A damper for a washing machine includes: a cylinder; a piston body having one end inserted into the cylinder; a first friction member interposed in a contact surface between the piston body and the cylinder; an extension bar extended from an inserted portion of the piston body, the extension bar having a circumferential stopper at the extended portion; a friction ring formed between the circumferential stopper and the first friction member; and a second friction member formed on an outer circumferential surface of the friction ring to contact with an inner surface of the cylinder.

6 Claims, 18 Drawing Sheets

FOREIGN PATENT DOCUMENTS

| | | |
|---|---|---|
| JP | 06-63291 | 3/1994 |
| JP | 6-277390 A | 10/1994 |
| JP | 08-103594 A2 | 4/1996 |
| JP | 2002-113283 | 4/2002 |
| KR | 2000-0014061 A | 3/2000 |

* cited by examiner

DAMPER IN A WASHING MACHINE AND FABRICATING METHOD OF THE SAME

CROSS REFERENCE TO RELATED APPLICATION

This is a divisional application of U.S. application Ser. No. 10/514,647 filed Nov. 16, 2004 now U.S. Pat. No. 7,281,614, which is the US National Phase of PCT application No. PCT/KR2003/002521 filed on Nov. 21, 2003, which claims priority on the following Korean applications, all of which were filed on Oct. 6, 2003, and the entire contents of which are incorporated by reference:

10-2003-0069206
10-2003-0069201
10-2003-0069200
10-2330-0069199
10-2003-0069198
10-2003-0069197
10-2003-0069196
10-2003-0069195

TECHNICAL FIELD

The present invention relates to a damper structure, and more particularly to a multi-step damper structure of a washing machine and a method for forming the same, in which a damping force is applied with multi-steps according to an amount of vibration occurring in the washing machine, and a large or small amount of vibration is attenuated appropriately to thereby operate the washing machine in a low noise state.

BACKGROUND ART

Washing machines are classified into a drum type, an agitator type and a pulsator type according to a washing method. Specifically, the drum washing machine has a protrusion portion formed on an inner wall of the cylinder. A washing operation is performed by an impact force occurring when a laundry is lifted up and dropped down along an inner circumferential surface of the drum due to the protrusion portion during a rotation of the drum.

Recently, the drum washing machine is widely used since a laundry is less damaged and a small amount of washing water is used.

FIG. 1 is a schematic view of a general drum washing machine.

Referring to FIG. 1, the drum washing machine includes a case 3 having a hollow cuboid shape, a tub 1 accommodated in the case 3 to contain water, a drum 2 formed inside the tub 1 to receive a laundry, and a driving motor 10 installed in a back of the tub 1 to rotate the drum 2.

Herein, an operation of the general drum washing machine will be described below.

First, a torque of the driving motor 10 is transferred to the drum 2 through a belt 11. If the drum 2 rotates, the laundry loaded into the drum 2 rotates together. At this time, the drum 2 rotates at a low speed. Therefore, if the laundry is placed in an upper portion of the drum during a rotation of the drum, the laundry is dropped down due to the gravity, so that the laundry collides with the washing water contained in the tub 1. The laundry stained with dirt can be washed due to the impact force occurring between the laundry and the washing water.

Additionally, the washing machine includes a weight pendulum 4 formed on one side of an outer circumference of the tub 1 to correct the center of gravity in back and forth/right and left directions of the tub 1, a spring 5 connected between the case 3 and the tub 1 to relieve an amount of vibration occurring in the tub 1 and the drum 2, and a damper 8 connected between the case 3 and the tub 1 to attenuate an amount of vibration occurring in the tub 1.

The weight pendulum 4 fundamentally eliminates the vibration due to an eccentric center of gravity of the tub 1 by matching the center of gravity of the tub 1.

Further, an amount of vibration due to the operation of the tub 1 is relieved by the spring 5 and attenuated by the damper, thereby rapidly attenuating an amount of vibration occurring during the operation of the tub 1.

In more detail, the damper 8 includes a cylinder 6 having one end portion connected to the tub 1, and a piston load 7 having one end portion connected to the case 3 and inserted into the cylinder 6.

FIG. 2 is a sectional view of a general damper.

Referring to FIG. 2, the general damper 8 includes the cylinder 6 and the piston load 7 having some portion inserted into the cylinder 6. The general damper 8 further includes a tub fixing opening 61 for allowing the piston load 7 to be connected to the tub 1, a case fixing opening 71 for allowing some portion of the piston load 7 to be connected to the case 3, a friction member 9 formed on one end portion of the piston load 7 to perform a friction action with an inner circumferential surface of the cylinder 6, and a vent 72 formed inside the piston load 7 to prevent an internal air of the cylinder 6 from being compressed.

Herein, an operation of the damper 8 will be described with reference to the structure of the damper 8.

When a predetermined amount of vibration occurs in the tub 1 and/or the drum 2, a relatively different displacement occurs in an inner circumferential surface of the cylinder 6 and an outer circumferential surface of the piston load 7. The vibration is converted into a frictional heat due to the friction member 9 formed between the cylinder 6 and the piston load 7. As a result, a frictional force of the tub 1 and/or the drum 2 is converted into a heat of the friction member 9 and then attenuated.

Additionally, in order to prevent the damper 8 from being damaged when the tub 1 is shaken in back and front/right and left directions, predetermined hole (e.g., circular hole) is formed in the tub fixing opening 61 and the case fixing opening 71, so that the damper 8 is fixed to the tub 1 and the case 3 in a freely movable state. In order to prevent the damping force from being lowered due to a compression of an internal air of the cylinder 6 when the piston load 7 moves in a left direction with reference to the drawing, the vent 72 forms a passage through which air is exhausted.

Meanwhile, the case of large amount of vibration and the case of small amount of vibration may occur in the drum washing machine. For example, a large amount of vibration occurs since a change in a drum rotation speed is great during an intermittent dewatering mode, and a small amount of vibration occurs since a change in a drum rotation speed is small during a continuous dewatering mode.

However, the same damping force is always generated in the general damper 8, as described above. Therefore, in case a small amount of vibration occurs, the damper 8 acts as a rigid body, such that an amount of vibration cannot be rapidly attenuated due to a vibration exceeding a displacement limit of the damper 8 and the damper 8 may be damaged. Considering this, it is usual to form the damper 8 to match the case a large amount of vibration occurs.

Since such a conventional damper cannot properly cope with the change in an amount of vibration, noise and vibration occur seriously, thereby causing an inconvenience of use.

In other words, there is a demand for a damper which can apply a large damping force when a large amount of vibration is generated and can apply a small damping force when a small amount of vibration is generated, thereby rapidly reducing the vibration and noise.

DISCLOSURE OF THE INVENTION

Accordingly, the present invention is directed to a damper for a washing machine that substantially obviates the problems caused by limitations and disadvantage of the conventional one.

One object of the present invention is to provide a damper for a washing machine, in which an appropriate damping force is applied in case a large or small amount of vibration is generated, thereby rapidly reducing an amount of vibration.

Another object of the present invention is to provide a damper for a washing machine, in which an appropriate damping force is applied to rapidly reduce an amount of vibration, and an amount of noise occurring due to a collision of parts during a generation of vibration.

Further another object of the present invention is to provide a damper for a washing machine, which is capable of preventing a damage of the damper.

To achieve the above objects, the present invention provides a damper for a washing machine, comprising: a cylinder; a piston body having one end inserted into the cylinder; a first friction member interposed in a contact surface between the piston body and the cylinder; an extension bar extended from an inserted portion of the piston body, the extension bar having a circumferential stopper at the extended portion; a friction ring formed between the circumferential stopper and the first friction member; and a second friction member formed on an outer circumferential surface of the friction ring to contact with an inner surface of the cylinder.

In accordance with another aspect of the present invention, a damper for a washing machine comprises: a cylinder; a piston body having one end inserted into the cylinder; a first friction member interposed between the piston body and the cylinder; an extension bar extended from an inserted portion of the piston body, the extension bar including a circumferential stopper expandedly formed at a predetermine position of the extended portion; a friction ring formed between the circumferential stopper and the piston body and operated by the circumferential stopper and the piston body; and a second friction member interposed in a contact portion between the friction ring and the cylinder.

In accordance with another aspect of the present invention, a damper for a washing machine includes: a cylinder; a piston body having one end portion inserted into the cylinder and a hollow central portion; a first friction member interposed between the piston body and the cylinder; an extension bar having one end portion insertedly fixed to the central portion of the piston body and the other end portion extended from the piston body, the extension bar including a circumferential stopper expandedly formed at the extended end portion; a friction ring formed between the circumferential stopper and the piston body and operated by the circumferential stopper and the piston body; and a second friction member interposed in a contact portion between the friction ring and the cylinder.

In accordance with another aspect of the present invention, a method for forming a damper for a washing machine includes the steps of: connecting an elastic member to an end portion of a piston body, connecting another elastic member to an extension bar, and placing a friction ring in an outer circumference of the extension bar; inserting one end portion of the extension bar into the piston body to fix the extension bar and the piston body by means of a stopper structure; and inserting a combination of the extension bar and the piston body into the cylinder.

In accordance with another aspect of the present invention, a damper for a washing machine includes: a cylinder; a piston body having one end portion inserted into the cylinder; a first friction member disposed in a contact surface between the piston body and the cylinder; an extension bar extended from an inserted portion of the piston body, the extension bar including a circumferential stopper formed on the extended portion; a friction ring inserted into the cylinder, the friction ring including a friction ring stopper some portion of which is contracted; and a second friction member formed on an outer circumferential surface of the friction ring to contact with an inner surface of the cylinder.

In accordance with another aspect of the present invention, a damper for a washing machine includes: a cylinder; a piston body having one end portion inserted into the cylinder; a first friction member interposed between the piston body and the cylinder; an extension bar extended from an inserted portion of the piston body; a friction ring formed on an outer side spaced apart from the extension bar; a friction ring rotation preventing means for preventing a rotation of the friction ring; and a second friction member formed on an outer circumferential surface of the friction ring to contact with an inner surface of the cylinder.

In accordance with another aspect of the present invention, a damper for a washing machine includes: a cylinder; a piston body having one end portion inserted into the cylinder; a first friction member interposed in a contact surface between the piston body and the cylinder; an extension bar extended from an inserted portion of the piston body, the extension bar including a circumferential stopper formed on the extended portion; a friction ring formed between the circumferential stopper and the first friction member, the friction ring including a reinforcement rib protrudedly formed on an inner circumferential surface; and a second friction member formed on an outer circumferential surface of the friction ring to contact with an inner surface of the cylinder.

In accordance with another aspect of the present invention, a damper for a washing machine includes: a cylinder; a piston body having one end portion inserted into the cylinder, and an extension bar extended from the piston body and having a diameter smaller than the piston body, the piston body and the extension bar being formed as one body; a first friction member interposed in a contact surface between the piston body and the cylinder; a friction ring formed between the extension bar and the first friction member; and a second friction member formed on an outer circumferential surface of the friction ring and contacting with an inner surface of the cylinder.

In accordance with another aspect of the present invention, a method for forming a damper for the washing machine includes the steps of: inserting a friction ring into an outer side spaced apart from an extension bar; arranging a circumferential stopper in one end of the extension bar to fix the circumferential stopper; and inserting the extension bar into a cylinder.

The damper for the washing machine and the method for forming the same can rapidly reduce an amount of vibration occurring in the washing machine.

Further, it is possible to prevent the damper from being damaged due to a large amount of vibration.

BRIEF DESCRIPTION OF THE DRAWINGS

The above objects, other features and advantages of the present invention will become more apparent by describing the preferred embodiments thereof with reference to the accompanying drawings, in which.

BEST MODE FOR CARRYING OUT THE INVENTION

Hereinafter, preferred embodiments of the present invention will be described in detail with reference to the attached drawings.

FIGS. 3 to 6 illustrate a first embodiment of the present invention.

Figure 1:
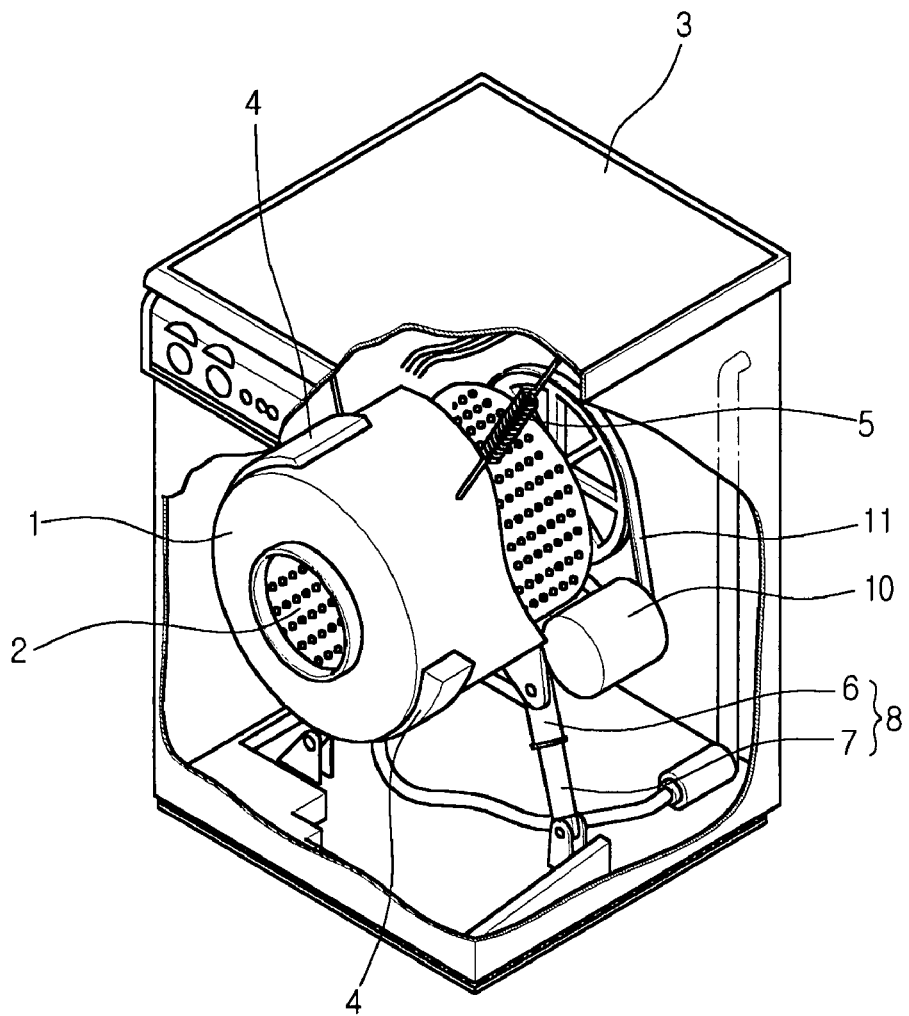
FIG. 1 is a schematic view of a conventional durum washing machine.
Figure 2:
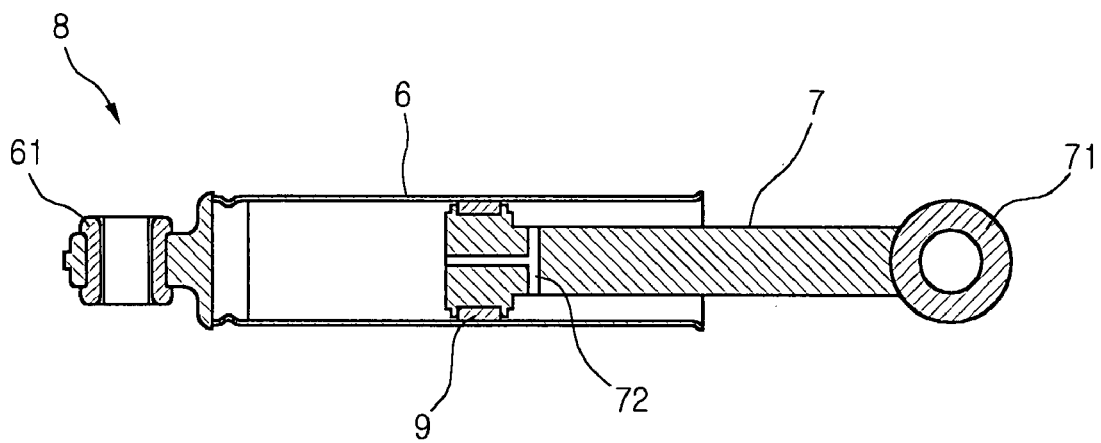
FIG. 2 is a sectional view of a conventional damper for a washing machine.
Figure 3:
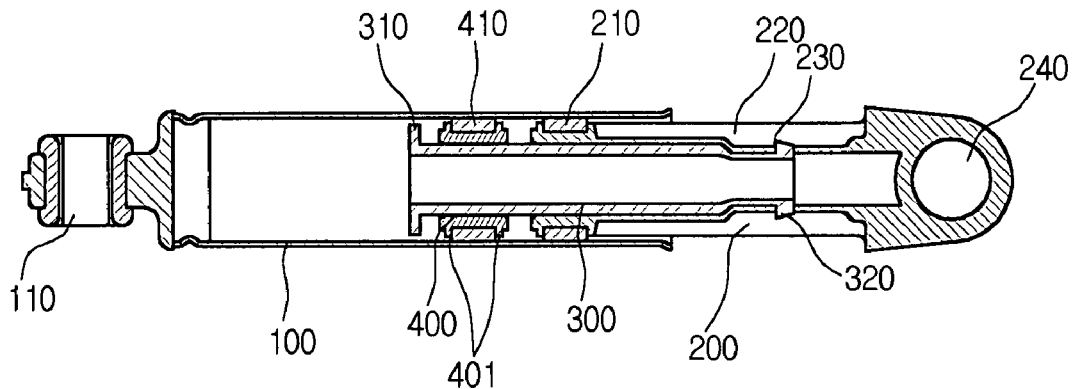
FIG. 3 is a sectional view of a damper for a washing machine according to a first embodiment of the present invention.

FIG. 3 is a sectional view of a damper for a washing machine according to a first embodiment of the present invention.

Referring to FIG. 3, the damper for the washing machine includes a hollow cylinder 100, a piston body 200 inserted into the hollow portion of the cylinder 100, an extension bar 300 coupled to the piston body 200 and extended therefrom, and a circular friction ring 400 that surficially contacts with an inner circumferential surface of the cylinder 100 in a state that a free movement is possible because a predetermined interval is maintained with an outer circumferential surface of the extension bar 300.

Additionally, the damper for the washing machine includes a tub fixing opening 110 formed at one end portion of the cylinder 100 and connected to a tub of the washing machine, a case fixing opening 240 formed at one end portion of the piston body 200 and connected to a case of the washing machine, a first friction member 210 formed on an outer circumferential surface of the other end portion of the piston body 200 to cause a frictional action, and a plurality of cooling fins 220 elongatedly formed on an outer circumferential surface of the piston body 200 to emit a frictional heat out of the damper. Specifically, the first friction member 210 can be formed on a left end portion of the piston body in order to lengthen a movement distant of the piston body 200 to the maximum.

Further, the damper for the washing machine includes a second friction member 410 formed on an outer circumferential surface of the frictional ring 400 to cause a frictional action with the inner circumferential surface of the cylinder 100, and a fitting protrusion 401 for allowing the second friction member 410 to be fitted into the friction ring 400.

Further, the first and second friction members 210 and 410 can be provided with a porous plastic coated with a lubricant. Here, viscous fluids such as grease can be used as the lubricant.

Further, the damper for the washing machine includes an elastically deformable opening 320 formed on one end portion of the extension bar 300, and a fixing groove 230 formed on a predetermined position of the piston body 200 and to which the elastically deformable opening 320 is insertedly fixed. A circumferential stopper 310 is formed on the other end portion of the extension bar 300. When the piston body 200 moves in a right direction on the drawing, that is, when the cylinder 100 moves in a left direction, the friction ring 400 is caught by the circumferential stopper 310.

Herein, an operation of the damper for the washing machine according to the present invention will be described in brief.

In a state that the tub fixing opening 110 and the case fixing opening 240 are respectively connected to the tub and the case of the washing machine, an amount of vibration due to an operation of the washing machine is transferred through the tub fixing opening 110 to the damper. Therefore, the amount of the vibration occurring in the washing machine causes a displacement of the cylinder 100 and the cylinder 100 moves relatively with respect to the piston body 200 fixed to the case and stopped therein.

If the cylinder 100 moves, the amount of the vibration is attenuated due to a damping force, which is generated due to a frictional force between the inner circumferential surface of the cylinder 100 and the outer circumferential surface of the first friction member 210. Meanwhile, if the displacement of the cylinder 100 is great due to a large amount of the vibration, the friction ring 400 contacts with the circumferential stopper 310 and the left end portion of the piston body 200, so that a frictional force is generated in the second friction member 410 with the same elasticity as the first friction member 210.

In more detail, if the displacement of the cylinder 100 is small due to a small amount of the vibration, a small damping force occurs because a frictional force is generated only between the inner circumferential surface of the cylinder 100 and the first friction member 210. However, if the displacement of the cylinder 100 is great due to a large amount of the vibration, a frictional force is generated between the inner circumferential surface of the cylinder 100 and the second friction member 410, as well as between the inner circumferential surface of the cylinder 100 and the first friction member 210. As a result, a larger damping force occurs.

As described above, in case that the amount of the vibration is small, a small frictional force or damping force is applied, and in case that the amount of the vibration is great, a large frictional force or damping force is applied. Therefore, a large or small damping force is applied according to the specific cases, that is, the amount of the vibration. For example, if a large amount of the vibration occurs like an intermittent dewatering mode, the frictional force is generated between the first and second friction members 210 and 410 and the inner circumferential surface of the cylinder 100, thus causing a large damping force. However, if a small amount of the vibration occurs like a continuous dewatering mode, the frictional force is generated only between the first friction member 210 and the inner circumferential surface of the cylinder 100, thus causing a small damping force.

Meanwhile, the elastically deformable opening 320 is provided for stably assembling the extension bar 300 and the piston body 200 and makes it possible to fix the extension bar 300 to the piston body 200 in whole after the friction ring 400 is inserted into the extension bar 300. In other words, if one end portion of the extension bar 300 is fit into the piston body 200 after the friction ring 400 is inserted into the outer circumferential surface of the extension bar 300, the opening 320 is deformed elastically. Then, if the extension bar 300 is completely inserted and thus reaches a position where the fixing groove 230 and the elastically deformable opening 320 are arranged, the elastically deformable opening 320 is recovered and inserted into the fixing groove 230. Through the above assembly process, the extension bar 300 and the piston body 200 can be completely and fixedly combined with each other.

Figure 4:
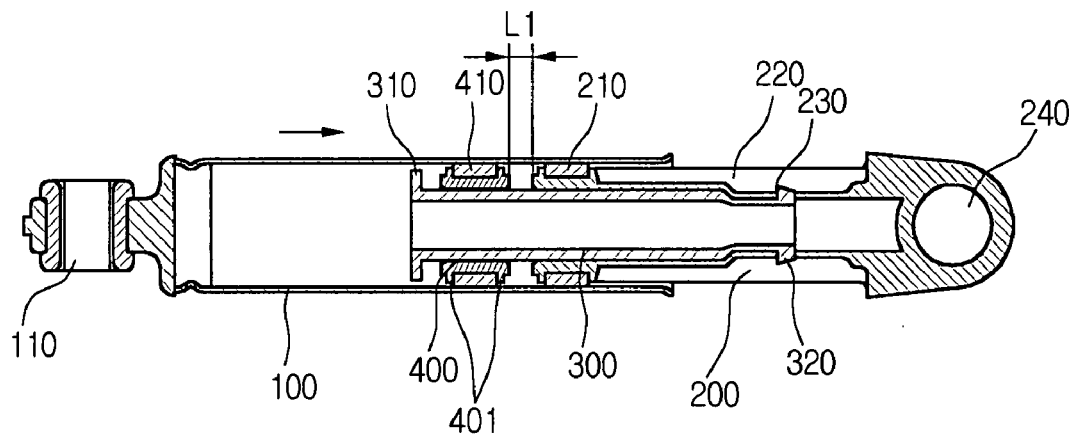
FIG. 4 is a sectional view showing the case that a contractile force is applied to a damper for a washing machine according to a first embodiment of the present invention.
Figure 5:
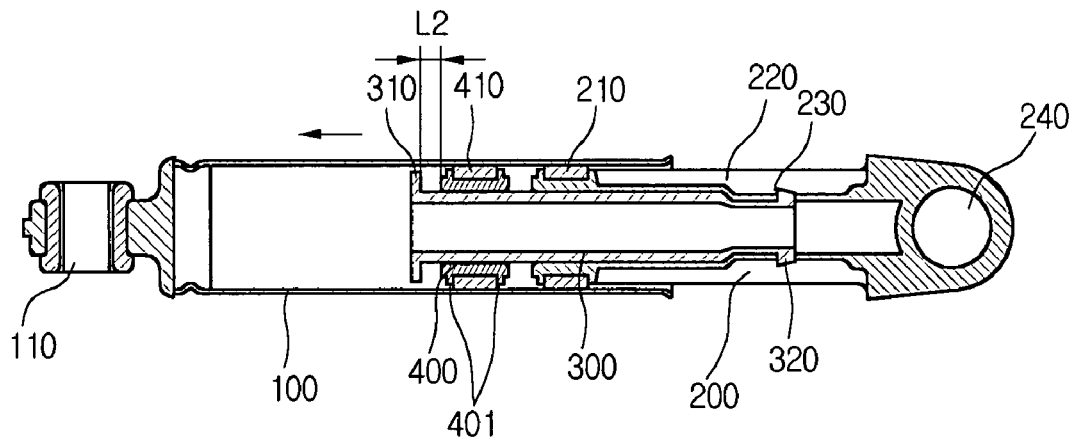
FIG. 5 is a sectional view showing the case that a tensile force is applied to a damper for a washing machine according to a first embodiment of the present invention.

FIG. 4 is a sectional view showing the case that a contractile force is applied to the damper for the washing machine according to the present invention, and FIG. 5 is a sectional view showing the case that a tensile force is applied to the damper for the washing machine according to the present invention. Herein, the operation of the damper according to the present invention will be described below in detail.

Referring to FIGS. 4 and 5, in case the contractile force is applied, the cylinder 100 moves in a right direction (an arrow direction of FIG. 4). In more detail, when the cylinder 100 moves in the right direction, a frictional force is generated in a contact surface between the inner circumferential surface of the cylinder 100 and the first friction member 210 because the first friction member 210 is still. However, the second friction member 410 and the friction ring 400 move in the right direction together with the cylinder 100. Therefore, no frictional force is generated in a contact surface between the friction ring 400 and the cylinder 100. In order to make the friction member 410 and the friction ring 400 move together with the cylinder 100, the inner circumferential surface of the friction member 410 and the outer circumferential surface of the extension bar 300 are not fixed and can be spaced apart from each other by a predetermined interval.

Further, if the movement distance of the cylinder 100 exceeds "L1", the friction ring cannot move together with the cylinder 100 any more because the left portion of the piston body 200 contacts with the right portion of the friction ring 400. Therefore, after that time, the frictional force applied to the cylinder 100 is a sum of the frictional forces of the first and second friction members 210 and 410.

Meanwhile, in case the tensile force is applied to the damper, the cylinder 100 moves in the left direction (an arrow direction of FIG. 5). When the cylinder 100 moves in the left direction, a frictional force is generated in a contact surface between the inner circumferential surface of the cylinder 100 and the first friction member 210 because the first friction member 210 is still with respect to the cylinder 100. However, the second friction member 410 and the friction ring 400 move in the left direction together with the cylinder 100. In order to make the friction member 410 and the friction ring 400 move together with the cylinder 100, the inner circumferential surface of the friction member 410 and the outer circumferential surface of the extension bar 300 are not fixed and can be spaced apart from each other by a predetermined interval.

If the cylinder 100 continues to move and the movement distance of the cylinder 100 exceeds "L2", the friction ring cannot move together with the cylinder 100 any more because the circumferential stopper 310 contacts with the left portion of the friction ring 400. Therefore, after that time, the frictional force applied to the cylinder 100 is a sum of the frictional forces of the first and second friction members 210 and 410.

Figure 6:
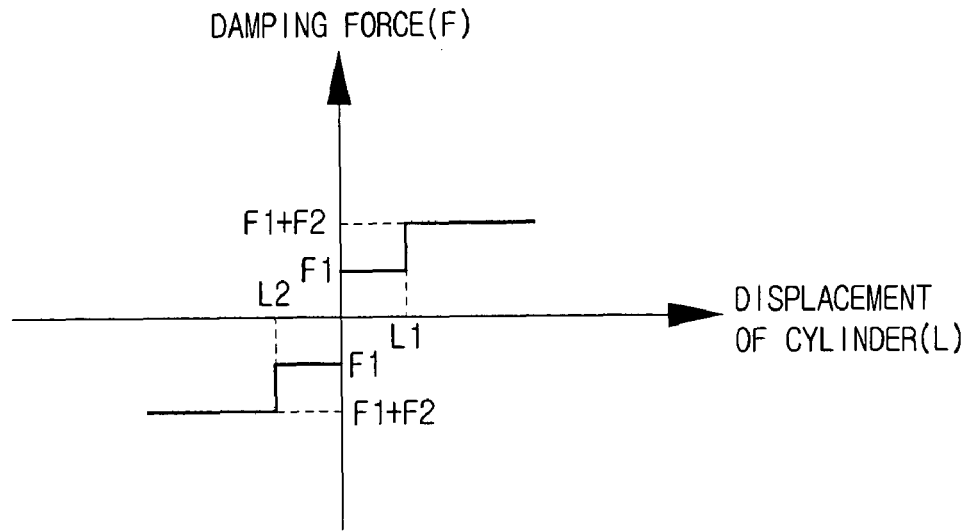
FIG. 6 is a graph showing a relationship between a displacement of a cylinder and a damping force in a damper for a washing machine according to a first embodiment of the present invention.

FIG. 6 is a graph showing a relationship between the displacement of the cylinder and the damping force in the damper for the washing machine according to the present invention.

In FIG. 6, a horizontal axis is the displacement (L) of the cylinder and a vertical axis is the damping force (F) generated by the damper. Herein, the operation of the damper will be described below in detail with reference to FIG. 6.

When the cylinder 100 moves in the right direction (the arrow direction of FIG. 4) due to an external force, only a damping force (F1) derived from a small frictional force caused by the first friction member 210 is applied till before the displacement (L) reaches a predetermined distance (L1). Then, if the cylinder 100 continues to move and exceeds the predetermined distance (L1), a frictional force is generated due to both the first and second friction members 210 and 410 at the same time. A damping force (F1+F2) derived from a large frictional force caused by the first and second friction members 210 and 410 is applied. Therefore, the vibration can be attenuated rapidly in a noiseless state by applying a small damping force with respect to a small vibration having a small displacement. In addition, the vibration can be attenuated rapidly without noise and damage of the damper due to a large frictional force and a large damping force by applying a large damping force with respect to a large vibration having a large displacement.

Further, when the cylinder 100 moves in the left direction (the arrow direction of FIG. 5) due to an external force, only a damping force (F1) derived from a small frictional force caused by the first friction member 210 is applied till before the displacement (L) reaches a predetermined distance (L2). Then, if the cylinder 100 continues to move and the displacement (L) exceeds the predetermined distance (L2), a frictional force is generated due to both the first and second friction members 210 and 410 at the same time. A damping force (F1+F2) derived from a large frictional force caused by the first and second friction members 210 and 410 is applied. Therefore, the vibration can be attenuated rapidly in a noiseless state by applying a small damping force with respect to a small vibration having a small displacement. In addition, the vibration can be attenuated rapidly without noise and damage of the damper due to a large frictional force and a large damping force by applying the large damping force (F1+F2) with respect to a large vibration having a large displacement.

In other words, the vibration can be attenuated rapidly in a noiseless state with respect to any amount of the vibration by applying different damping forces to the damper according to the amount of the vibration and the magnitude of the displacement.

Further, in this embodiment, the positions of the cylinder 100 and the piston body 200 can be changed. In other words, the cylinder 100 and the piston body 200 can be connected to the case side and the tub side, respectively.

Further, the cylinder 100 and the piston body 200 are connected to the tub and the case of the washing machine in a direction that the first and second fixing openings 110 and 240 are crossed with each other. In other words, if a hole of the first fixing opening 110 is positioned in a vertical direction, a hole of the second fixing opening 240 is positioned in a horizontal direction, and vice versa. In this manner, in addition to a length direction of the damper, the vibration can be attenuated somewhat with respect to a width direction of the damper according to the fundamental function of the damper. Furthermore, it is possible to prevent the damper from being damaged due to the vibration.

Figure 7:
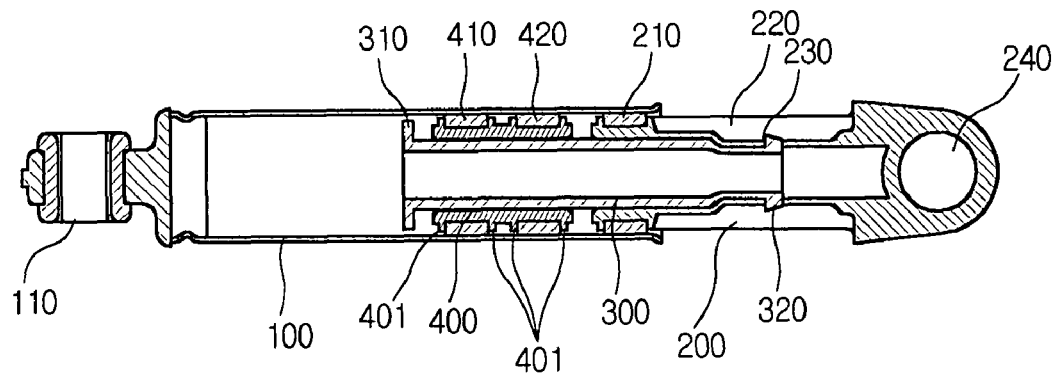
FIG. 7 is a sectional view of a damper for a washing machine according to a second embodiment of the present invention.

FIG. 7 is a sectional view of a damper for a washing machine according to a second embodiment of the present invention Referring to FIG. 7, a structure of the damper for the washing machine according to the second embodiment of the present invention is mostly similar to that of the damper according to the first embodiment of the present invention. A difference is that a third friction member 420 except for the second friction member 410 is additionally formed on the outer circumferential surface of the friction ring 400. By doing so, the damping force applied to the damper is generally increased much more.

In other words, the damping force (F1) is identical to the first embodiment till before the displacement of the cylinder 100 reaches a predetermined distance. On the other hand, if the displacement of the cylinder 100 exceeds the predetermined distance, a damping force is larger than the damping force (F1+F2) of the first embodiment. As a result, the vibration can be attenuated more rapidly by applying the frictional force caused by the first to third friction members 210, 410 and 420.

Further, due to a condition that widths of the friction members 410 and 420 are limited to a predetermined length, this embodiment can be applied conveniently to the case that the respective friction members must be used separately.

Figure 8:
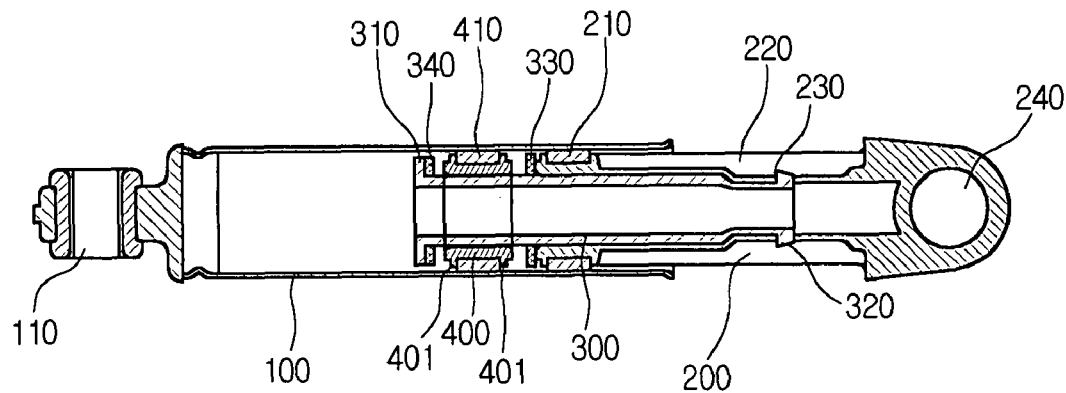
FIG. 8 is a sectional view of a damper for a washing machine according to a third embodiment of the present invention.
Figure 9:
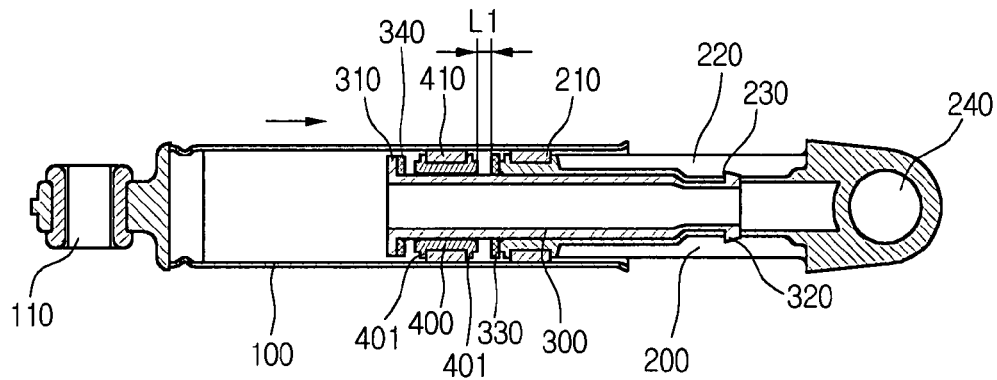
FIGS. 9 and 10 are sectional views showing an operation of the damper for the washing machine according to the third embodiment of the present invention.
Figure 10:
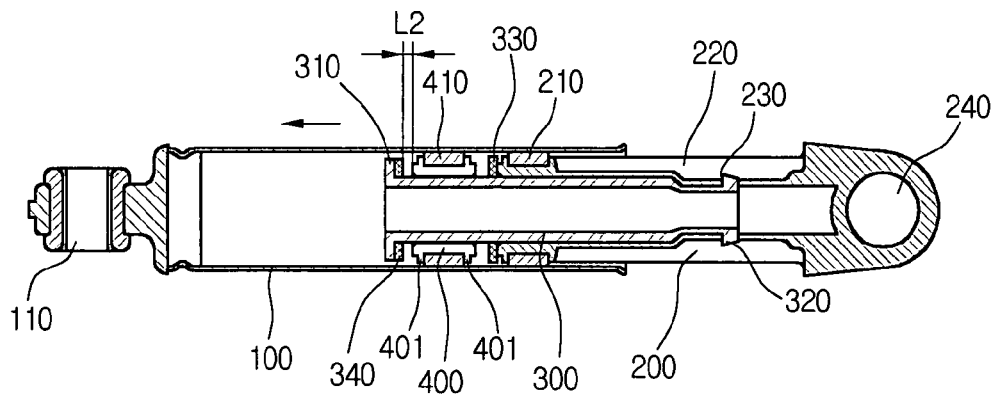

FIGS. 8 to 10 illustrate a third embodiment of the present invention.

Referring to FIG. 8, a structure of the damper for the washing machine according to the third embodiment of the present invention is mostly similar to that of the damper according to the first embodiment of the present invention. A difference is that the damper according to the third embodiment of the present invention further includes a first elastic member 320 formed on an end portion of the piston body 200, and a second elastic member 340 formed on an inner surface of the circumferential stopper 310.

In more detail, the second elastic member 340 of a soft elastic material, such as a rubber, is inserted into the inner surface of the circumferential stopper 310 in order to allow the circumferential stopper 310 and the friction ring 400 to softly contact with each other without any impact. Herein, an effect of the second elastic member 340 will be described below. Since a large vibration occurs with a short frequency at a high speed operation of the washing machine, the circumferential stopper 310 and the friction ring 400 contact with each other at a fast speed. The strong impact due to the contact acts as a noise. Therefore, the inserted second elastic member 340 of a soft material can relieve the impact occurring at the contact surface.

FIGS. 9 and 10 are sectional views illustrating an operation of the damper for the washing machine according to the third embodiment of the present invention. In more detail, FIGS. 9 and 10 are sectional views showing the cases that a contractile force and a tensile force are applied to the damper for the washing machine according to the third embodiment of the present invention, respectively. In the drawings, an operational mechanism of reducing the vibration and noise is identical to the first embodiment of the present invention. However, in case the movement distance of the cylinder 100 exceeds "L1" and "L2" and the friction ring 400 contacts with and collides the end portion of the circumferential stopper 310 and/or the end portion of the piston body 200, the impact force can be relieved sufficiently due to the first elastic member 330 and/or the second elastic member 340.

Since the impact forces occurring at the respective contact surfaces can be relieved due to the first and second elastic members 330 and 340, it is possible to prevent the degradation of the respective parts and the occurrence of noise and vibration.

FIGS. 11 to 15 illustrate a fourth embodiment of the present invention. A structure of the damper for the washing machine according to the fourth embodiment of the present invention is mostly similar to that of the damper according to the third embodiment of the present invention. A difference is a forming process and structure of the elastic member for relieving the impact.

Figure 11:
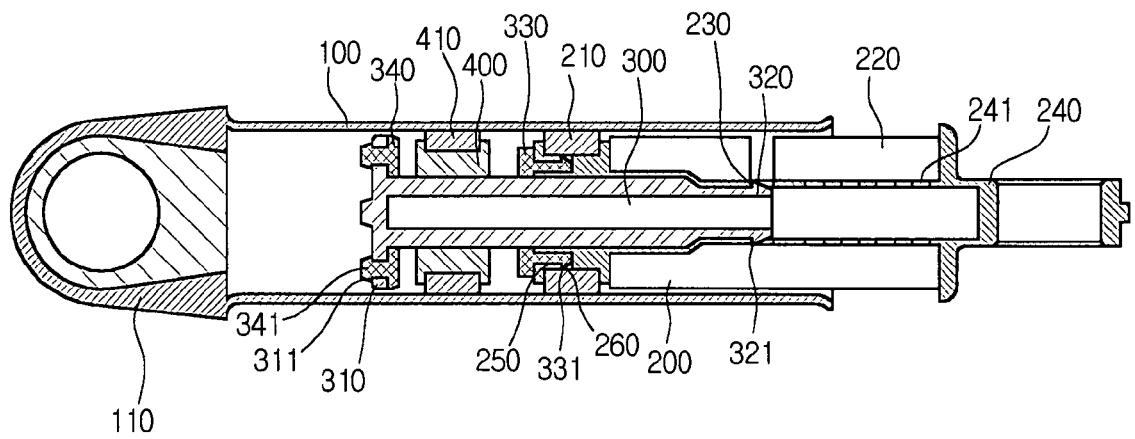
FIG. 11 is a sectional view of a damper for a washing machine according to a fourth embodiment of the present invention.

Herein, the structure of the damper according to the fourth embodiment of the present invention will be describe below with reference to FIG. 11. Referring to FIG. 11, the damper for the washing machine according to the fourth embodiment of the present invention includes a cylinder 100, a piston body 200, an extension bar 300, a circular friction ring 400, a tub fixing opening 110, a case fixing opening 240, a first friction member 210, a second friction member 410, a cooling fin 220, an elastically deformable opening 320, an elastically deformable opening stopper 321 formed on an end portion of the elastically deformable opening 320 to fix the extension bar 300 to the piston body 200, a fixing groove 230, a circumferential stopper 310, a first elastic member 330, and a second elastic member 340, which are similar to the third embodiment of the present invention.

In this embodiment, the damper according to the fourth embodiment of the present invention further includes an insertion protrusion 341 and a second elastic member insertion hole 311 in order to allow the second elastic member 340 to be fitted. The insertion protrusion 341 is protrudedly formed on one surface of the second elastic member 340, and the second elastic member insertion hole 311 is formed by opening the circumferential stopper 310 in order to allow the insertion protrusion 341 to be arranged and fitted.

Specifically, a predetermined protrusion can be further formed on a body of the insertion protrusion 341 in order to allow the insertion protrusion 341 not to be released after the insertion protrusion 341 is fitted into the second elastic member insertion hole 311.

Further, the first elastic member 330 is formed in a circular shape so that it can be fitted into the piston body 200. The damper according to the fourth embodiment of the present invention further includes at least one first elastic member hook protrusion 331 formed on one surface of the circular first elastic member 330, a first elastic member insertion groove 250 formed on one end portion of the piston body 200 in order to allow a cylinder of the first elastic member 330 to be fitted into an inside of the piston body 200, and a first elastic member hook groove 260 formed on a position in which the first elastic member hook protrusion 331 is arranged in the first elastic member insertion groove 250.

Herein, an installation operation of the first elastic member 330 will be described below. First, the first elastic member insertion groove 250 is formed in a length direction of the piston body 200 and the first elastic member hook protrusion 331 is then inserted into the first elastic member insertion groove 250. At this time, the first elastic member 330 can be inserted in a predetermined arrangement direction so that the first elastic member hook protrusion 331 and the first elastic member hook groove 260 can be arranged. The first elastic member 330 can be stably fixed at a position in which the first elastic member hook protrusion 331 and the first elastic member hook groove 260 are arranged and caught.

Further, a plurality of cooling holes 241 are formed on the piston body 200 in order to emit an internal heat out of the damper. The cooling holes 241 rapidly disperse a frictional heat, which is generated during an operation of the damper, out of the damper together with the cooling fin 220.

Herein, an installation operation of the extension bar 300 will be described below. After the friction ring 400 is inserted into the extension bar 300, the extension bar 300 is made to be fixable to the piston body 200 in whole. Specifically, if the friction ring 400 is inserted into the outer circumference of the extension bar 300 and one end portion of the extension bar 300 is then inserted into the piston body 200, the elastically deformable opening 320 is deformed due to the elasticity. The extension bar 300 is completely inserted and thus reaches a position where the fixing groove 230 and the elastically deformable opening 320 are arranged and the elastically deformable opening stopper 321 is recovered and inserted into the fixing groove 230. Through the above assembly process, the extension bar 300 and the piston body 200 can be completely and fixedly combined with each other.

Figure 12:
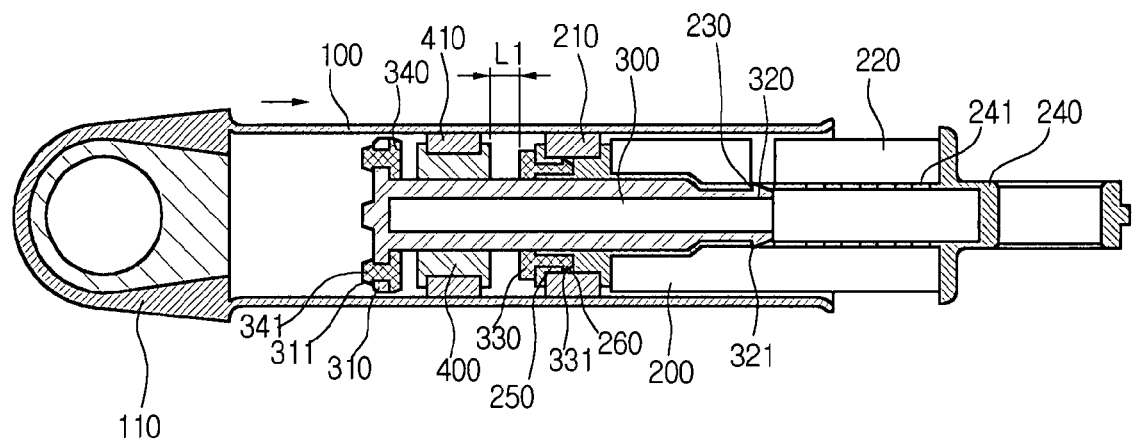
FIGS. 12 and 13 are sectional views showing an operation of the damper for a washing machine according to the fourth embodiment of the present invention.
Figure 13:
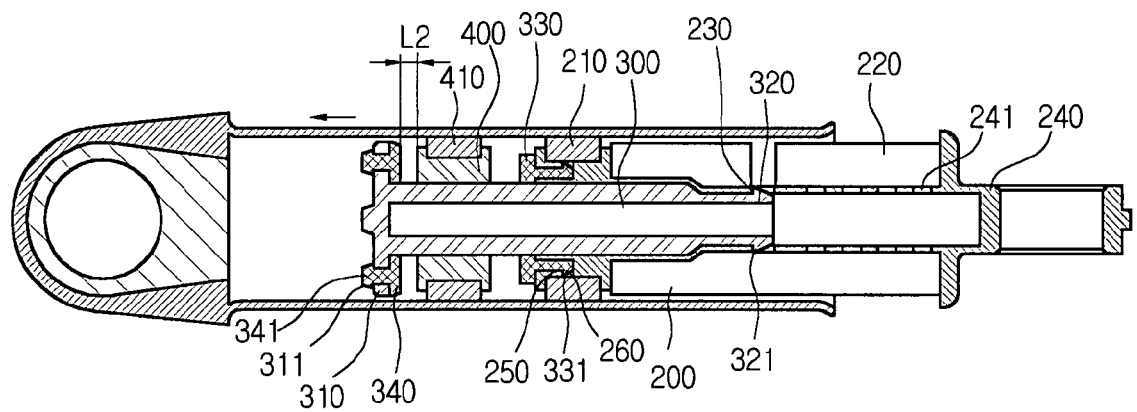

An operation of the damper for the washing machine according to the fourth embodiment of the present invention is identical to that according to the third embodiment of the present invention and will be easily understood with reference to FIGS. 12 and 13.

Figure 14:
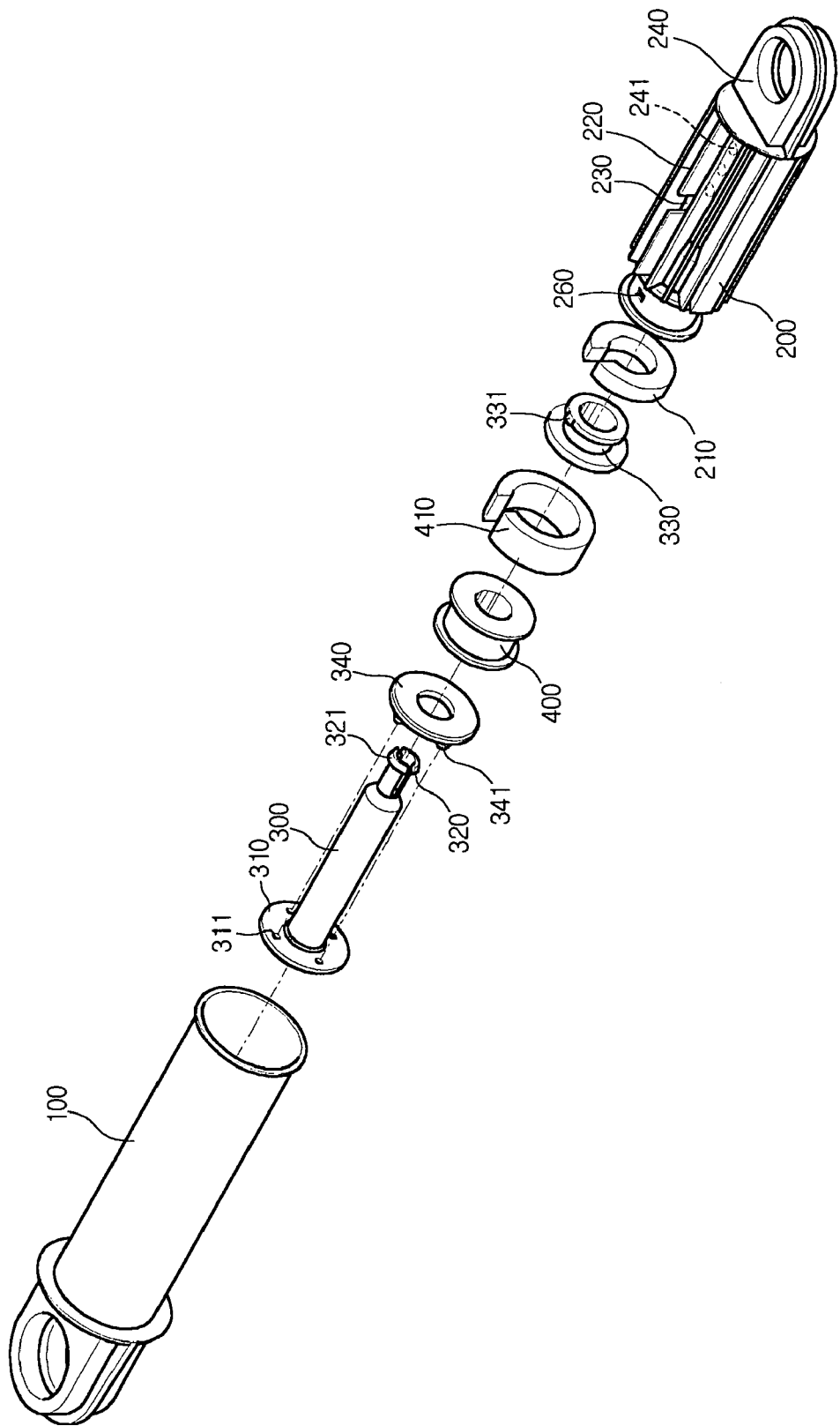
FIG. 14 is an exploded perspective view of the damper for the washing machine according to the fourth embodiment of the present invention.

FIG. 14 is an exploded perspective view of the damper for the washing machine according to the fourth embodiment of the present invention.

As described above, it can be seen from FIG. 14 that the damper for the washing machine includes the cylinder 100, the piston body 200, the extension bar 300, the friction ring 400, the first elastic member 330, the second elastic member 340, the first friction member 210, and the second friction member 410.

The plurality of cooling fins 220 are elongatedly formed on the outer circumferential surface of the piston body 200 in right/left direction. The fixing groove 230 is formed by depressing or opening the outer circumferential surface of the piston body 200 so that the elastically deformable opening stopper 321 can be deformed elastically and inserted thereinto. The cooling hole 241 rapidly emits the internal heat out of the piston body 200. The first elastic member hook groove 260 is caught by the first elastic member hook protrusion 331 to fix the position of the first elastic member 330 as a whole.

The right end portion of the extension bar 300 is divided up and down to form the elastically deformable opening 320, which is elastically deformed due to an external force. The elastically deformable opening stopper 321 is protrudedly formed on the end portion of the elastically deformable opening 320. The circumferential stopper 310 is expandedly formed on the left end portion of the extension bar 300. The second elastic member insertion hole 311 is formed on predetermined positions of the circumferential stopper 310. At least one insertion protrusion 341 is protrudedly formed on one side surface of the second friction member 340.

Herein, an assembly operation of the damper for the washing machine will be described below.

Figure 15:
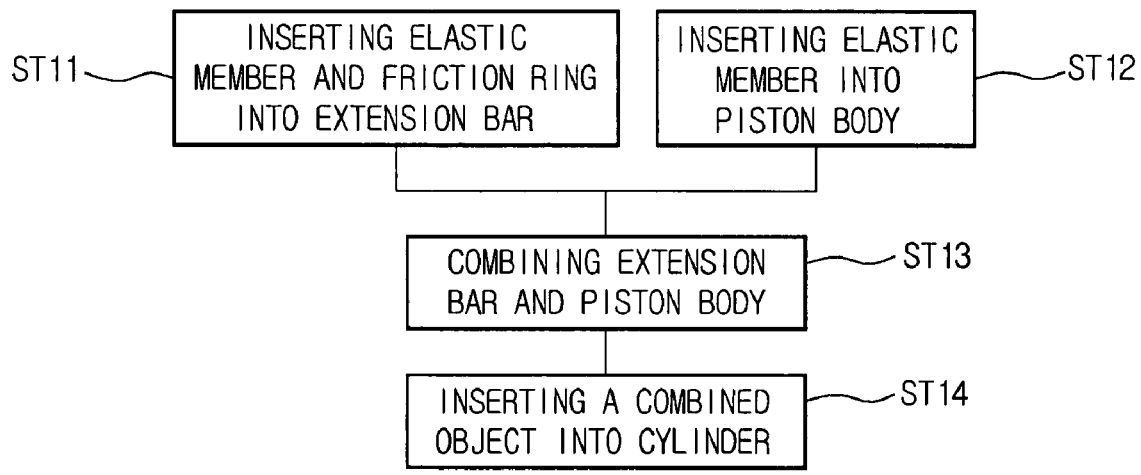
FIG. 15 is a flowchart showing a method for forming the damper for the washing machine according to the fourth embodiment of the present invention.

FIG. 15 is a flowchart showing an assembly order of the damper for the washing machine according to the fourth embodiment of the present invention.

Referring to FIG. 15, first, in order to form the damper for the washing machine, the second elastic member 340 and the friction ring 400 are inserted into the extension bar 300 (ST11). At this time, the second elastic member 340 is completely cohered to the circumferential stopper 310 due to a predetermined stopper structure, so that the process of fixing the extension bar 300 is easily performed.

The first friction member 330 is inserted into the piston body 200 independently of the formation of the extension bar 300 (ST12).

After the extension bar 300 and the piston body 200 are assembled, the extension bar 300 is inserted into the piston body 200 so that the elastically deformable opening stopper 321 formed on the extension bar 300 as one body can be fitted into the fixing groove 230 (ST13).

Finally, the combined object of the piston body 200 and the extension bar 300 is inserted into the inside of the cylinder 100, thus completing the damper for the washing machine (ST14).

Meanwhile, in the above assembly process, the connection of the first friction member 210 and the second friction member 410 can be performed in any steps till before the combined object of the piston body 200 and the extension bar 300 is inserted into the inside of the cylinder 100. However, since the friction members 210 and 410 may be formed by rolling rectangular resin around a predetermined portion of the combined object, it is preferable to form the friction members 210 and 410 just before the combined object is inserted into the inside of the cylinder 100.

Figure 16:
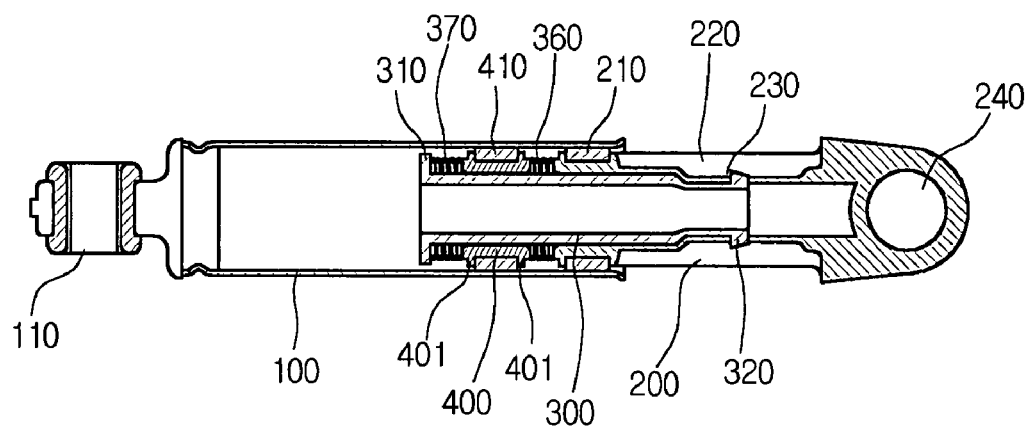
FIG. 16 is a sectional view of a damper for a washing machine according to a fifth embodiment of the present invention.

FIG. 16 illustrates a damper for a washing machine according to a fifth embodiment of the present invention.

Referring to FIG. 16, a structure of the damper for the washing machine according to the fifth embodiment of the present invention is mostly similar to that of the damper according to the third embodiment of the present invention. A difference is that first and second springs 360 and 370 are formed instead of the first and second elastic members 330 and 340.

In this embodiment, instead of the elastic member of the rubber material, springs are disposed on the contact surface. Therefore, an appropriate position in which the friction ring 400 begins to operate can be determined by adjusting a coefficient of elasticity. Additionally, since it is possible to prevent the contact between the friction ring 400 and the circumferential stopper 310 and/or the contact between the friction ring 400 and the end portion of the piston body 200, an amount of noise can be reduced much more. Specifically, the increase or decrease of the damping force can be achieved more slowly due to the friction ring 400 by slowly increasing the damping force, thereby improving a reduction effect of noise and vibration.

Figure 17:
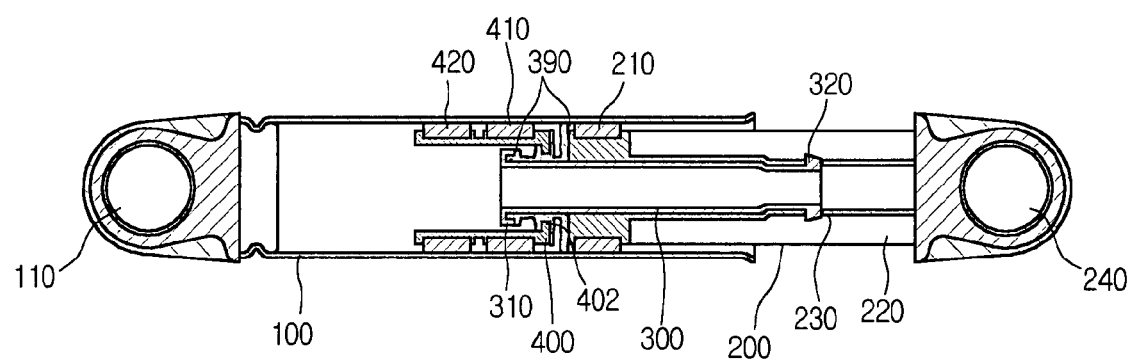
FIG. 17 is a sectional view of a damper for a washing machine according to a sixth embodiment of the present invention.
Figure 18:
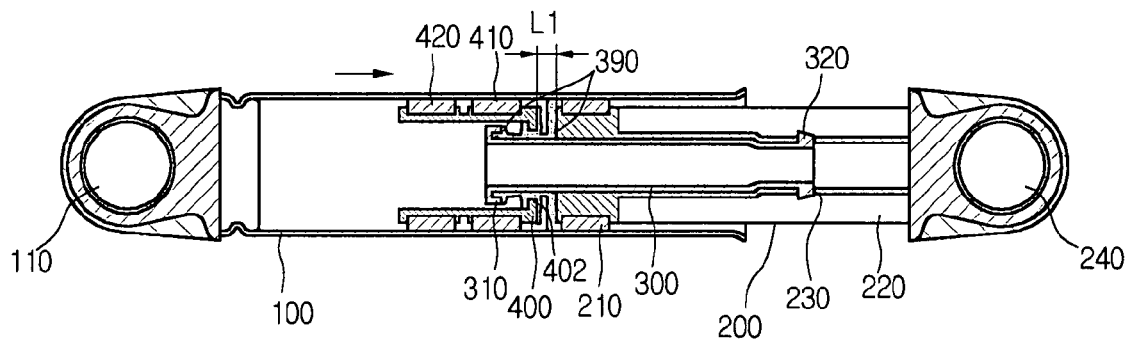
FIGS. 18 and 19 are sectional views showing an operation of a damper for a washing machine according to a sixth embodiment of the present invention.
Figure 19:
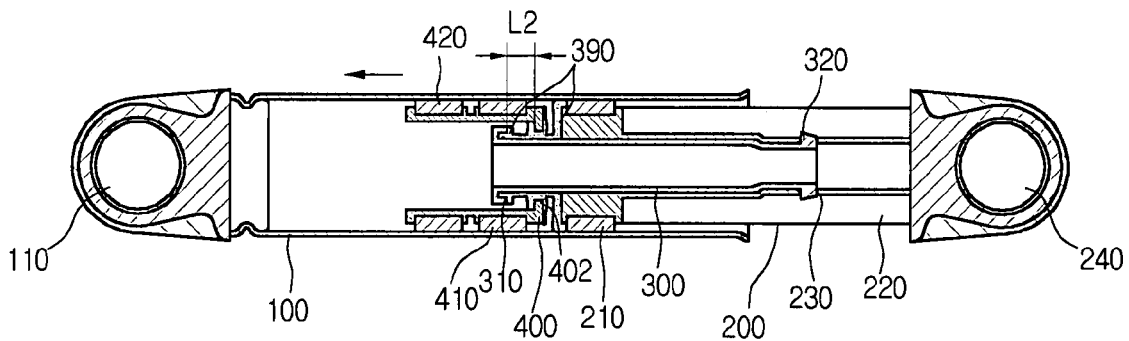

FIGS. 17 to 19 illustrate a sixth embodiment of the present invention.

FIG. 17 is a sectional view of the damper for the washing machine according to the sixth embodiment of the present invention. A structure of the damper for the washing machine according to the sixth embodiment of the present invention is mostly similar to that of the damper according to the first embodiment of the present invention. A difference is a structure of a friction ring, a piston body and/or an extension bar, which contact/contacts with the friction ring.

Like the conventional damper, the damper according to the present invention includes a cylinder 100, a piston body 200, an extension bar 300, a friction ring 400, a tub fixing opening 110, a case fixing opening 240, a first friction member 210, a cooling fin 220, a second friction member 410, and a third friction member 420.

However, a left end portion of the friction ring 400 can maintain a diameter of the friction ring body without contraction in order to allow the circumferential stopper 310 to pass smoothly. In order for the circumferential stopper 310 to be caught, a right end portion of the friction ring 400 includes a friction ring driving terminal 402 formed by reducing the diameter of the friction ring 400.

Additionally, a grease 390 is adhered to the respective contact surface of the friction ring 400, the extension bar 300 and the piston body 200. The detailed positions are represented by a reference numeral "390". The grease 390 can relieve the frictional force among the respective members and can also function to relieve a strong impact force among the respective members when the members are collided with each other.

Further, the damper according to the present invention includes an elastically deformable opening 320 formed on one end portion of the extension bar 300, and a fixing groove 230 into which the elastically deformable opening 320 is inserted. Further, the damper includes a circumferential stopper 310 formed on the other end portion of the extension bar 300. The circumferential stopper 310 functions to catch the friction ring 400 when the piston body 200 moves in a right direction with reference to the drawing, that is, when the cylinder 100 moves in a left direction with reference to the drawing. Specifically, since the circumferential stopper 310 is caught by the friction ring driving terminal 402, an operation of the friction ring 400 is induced when the extension bar 300 operates excessively, for example, when the cylinder 100 moves in the left direction with reference to the drawing. Of course, the friction ring 400 is caught by the left end portion of the piston body 200 and the operation of the friction ring 400 can be induced.

Meanwhile, a margin that allows the extension bar 300 to move in the right and left directions is lengthened by forming the friction ring driving terminal 402 on the right end portion of the friction ring 400, that is, the end portion of the piston body side. Specifically, if the friction ring driving terminal 402 is formed on the left end portion of the friction ring 400, that is, not the piston body 200 but the opposite side, the margin is shortened as much. Further, if the margin becomes narrow, the damper may be damaged due to the strong impact force when the strong vibration of the tub causes the cylinder 100 to move excessively. Since the cylinder 100 must be long in order to form the friction ring driving terminal 402 on the left end portion of the friction ring 400 and to prevent the damage of the damper, it is undesired in view of a space utilization of the washing machine, a difficulty in the installation, and the like.

An operation of the damper for the washing machine according to the sixth embodiment of the present invention is identical to that described in the first embodiment of the present invention. Therefore, its detailed description will be omitted. However, this embodiment is characterized in that the operation of the friction ring 400 can be started by the friction ring driving terminal 402 formed on the right end portion of the friction ring 400. In other words, at a point of time when the circumferential stopper 310 contacts with the friction ring driving terminal 402, the friction ring 400 may move in the right direction to increase the damping force. Or, at a point of time when the right end portion of the piston body 200 contacts with the friction ring driving terminal 402, the friction ring 400 may move in the left direction to increase the damping force.

Further, the grease 390 is adhered to the main surface of the friction ring driving terminal 402 in order to relieve the impact force when the piston body 200 and the circumferential stopper 310 contact with each other centering on the friction ring driving terminal 402. The impact in the collision can be buffered due to the grease 390. The present invention is not limited to the grease. In other words, any impact relief material of a fluid form can be used as the grease 390.

Although the drawing shows that the end portion of the circumferential stopper 310 is curved, the present invention is not limited to it. Even when the end portion of the circumferential stopper 310 is formed in a non-curved shape, it does not influence an effect of the present invention.

Figure 20:
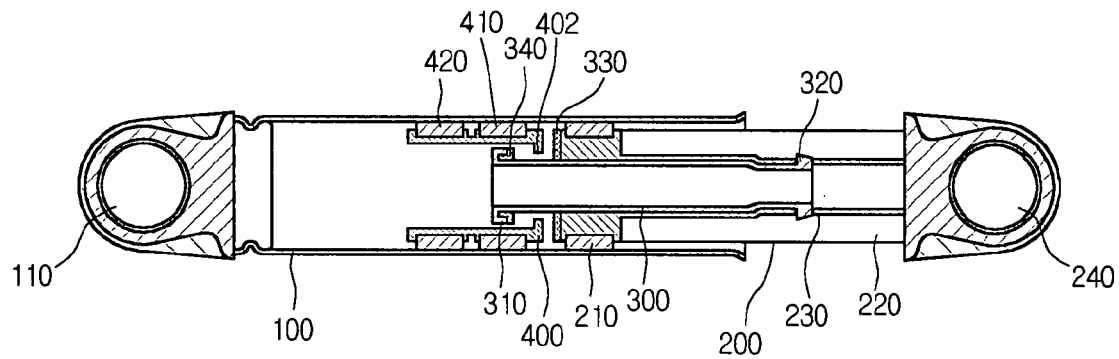
FIG. 20 is a sectional view of a damper for a washing machine according to a seventh embodiment of the present invention.

FIG. 20 illustrates a seventh embodiment of the present invention. A structure of the damper for the washing machine according to the seventh embodiment of the present invention is mostly similar to that of the damper according to the sixth embodiment of the present invention. A difference is that an elastic member instead of the grease (390, in FIG. 7) is formed as a member for relieving the impact force during the operation of the damper.

Specifically, first and second elastic members 330 and 340 are formed at a portion to which the grease 390 is adhered. Due to the elastic members 330 and 340, an impact force is relieved at a portion with which the friction ring contacts. The elastic members 330 and 340 can be adhered to or fitted into the piston body 200 and the circumferential stopper 310, respectively. As a fitting method, the method described in the fourth embodiment of the present invention can be applied. Further, as a method for relieving the impact force, the method described in the third embodiment of the present invention can be applied.

Figure 21:
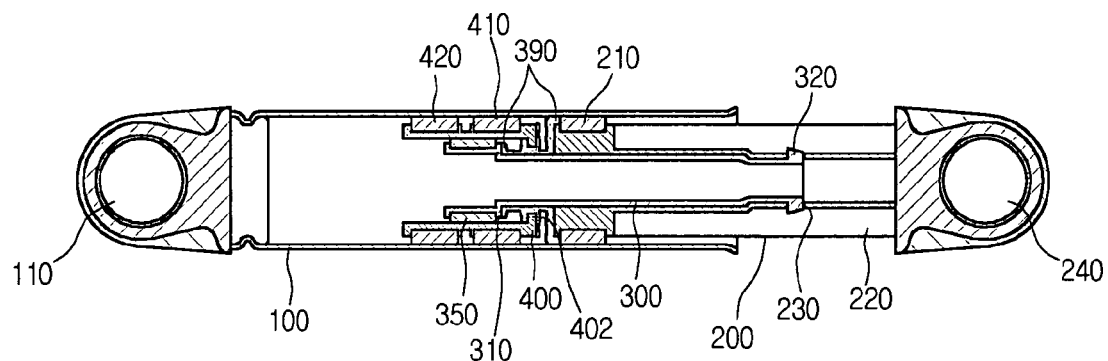
FIG. 21 is a sectional view of a damper for a washing machine according to an eighth embodiment of the present invention.

FIG. 21 is a sectional view of a damper for a washing machine according to an eighth embodiment of the present invention.

A structure of the damper for the washing machine according to the eighth embodiment of the present invention is mostly similar to that of the damper according to the sixth embodiment of the present invention. In this embodiment, a damping force can be increased by forming another friction member at a portion extended from the circumferential stopper 310 as one body. According to the structure according to the eight embodiment of the present invention, the damper for the washing machine includes the circumferential stopper 310 and a fourth friction member 350 formed at a portion extended from the circumferential stopper 310 to one side.

Specifically, the fourth friction member 350 is fixed to a body of the extension bar 300 and forms a contact surface with the inner circumferential surface of the friction ring 400. Therefore, when a relative displacement occurs between the extension bar 300 and the friction ring 400, a damping force due to a friction of the contact surface is generated.

As a result, when the cylinder 100 moves initially, the damping force due to the first friction member 210 and the damping force due to the fourth friction member 350 are generated at the same time. Here, the first friction member 210 is formed at the contact surface between the outer circumferential surface of the piston body 200 and the inner circumferential surface of the cylinder 100, and the fourth friction member 350 is formed at the contact surface between the outer circumferential surface of the extension bar 300 and the inner circumferential surface of the friction ring 400. In this manner, the damping force can be increased much more due to the generation of the additional damping force.

At this time, although only one of the first and fourth friction members 210 and 350 is formed, it does not influence the effect of the present invention. In this case, however, a frictional coefficient of the friction member used in the first and fourth friction members 210 and 350 must be large in order to generate the same damping force by using one damper.

Meanwhile, the fourth friction member 350 must have a frictional coefficient smaller than a sum of the frictional coefficients of the second and third friction members 410 and 420. If the frictional coefficient of the fourth friction member 350 is larger than the sum of the frictional coefficients of the second and third friction members 410 and 420, the friction ring 400 moves at the same time when the extension bar 300 moves. As a result, the friction ring 400 cannot move in a multi-stage.

An operation of the damper for the washing machine according to the eighth embodiment of the present invention will be described with reference to FIGS. 22 and 23.

Figure 22:
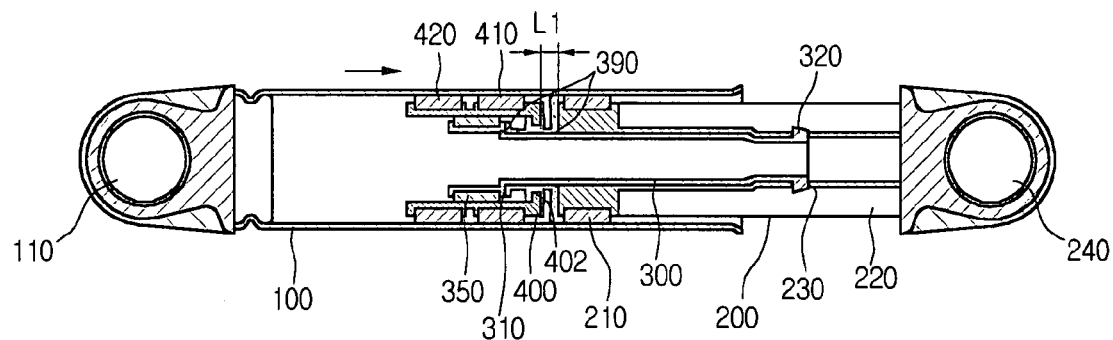
FIGS. 22 and 23 are sectional views showing an operation of a damper for a washing machine according to the eighth embodiment of the present invention.

First, if the contractile force is applied, the cylinder 100 moves in a right direction (an arrow direction of FIG. 22). When the cylinder 100 moves in the right direction, a frictional force is generated in a contact surface between the inner circumferential surface of the cylinder 100 and the first friction member 210 and between the inner circumferential surface of the friction ring 400 and the fourth friction member 350, because the first and fourth friction members 210 and 350 are still. However, the second and third friction members 410 and 420 and the friction ring 400 move in the right direction together with the cylinder 100. In order to operate the friction ring 400, the frictional coefficient of the fourth friction member 350 may be smaller than those of the second and third friction members 410 and 420.

Further, if the movement distance of the cylinder 100 exceeds "L1", the friction ring 400 cannot move together with the cylinder 100 any more because the left portion of the piston body 200 contacts with the friction ring stopper 402. Therefore, after that time, the frictional force applied to the cylinder 100 is a sum of the frictional forces of the second and third friction members 410 and 420.

Figure 23:
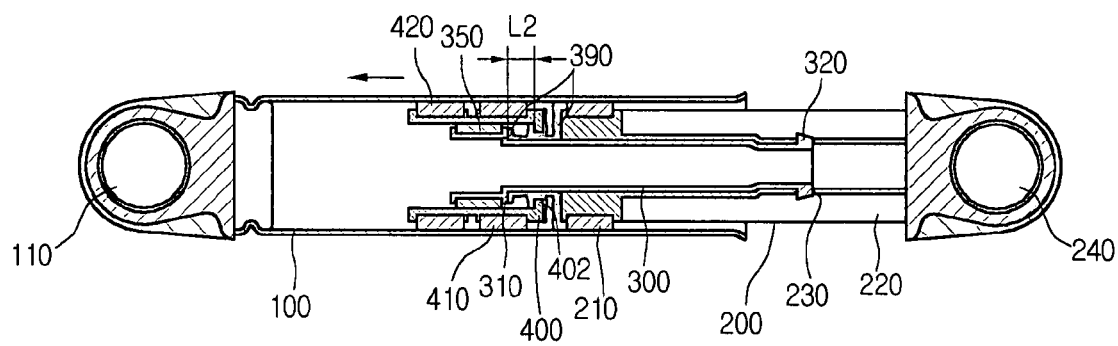

Further, in case the tensile force is applied to the damper, the cylinder 100 moves in the left direction (an arrow direction of FIG. 23). When the cylinder 100 moves in the left direction, a frictional force is generated in the contact surface between the inner circumferential surface of the cylinder 100 and the first friction member 210 and the contact surface between the inner circumferential surface of the friction ring 400 and the fourth friction member 350, because the first friction member 210 is still with respect to the cylinder 100 and the fourth friction member 350 is still with respect to the friction ring 400. However, the second and third friction members 410 and 420 and the friction ring 400 move in the left direction together with the cylinder 100.

If the cylinder 100 continues to move and the movement distance of the cylinder 100 exceeds "L2", the friction ring cannot move together with the cylinder 100 any more because the circumferential stopper 310 contacts with the friction ring driving terminal 402. Therefore, after that time, the frictional force applied to the cylinder 100 is a sum of the frictional forces of the second and third friction members 410 and 420.

This embodiment of the present invention has an effect that the damping force in the initial operation of the cylinder 100 can be increased much more.

Meanwhile, in this embodiment, the damping force according to the operation of the cylinder 100 can be controlled more variously by adjusting the frictional coefficients of the first to fourth friction members 210, 410, 420 and 350.

Figure 24:
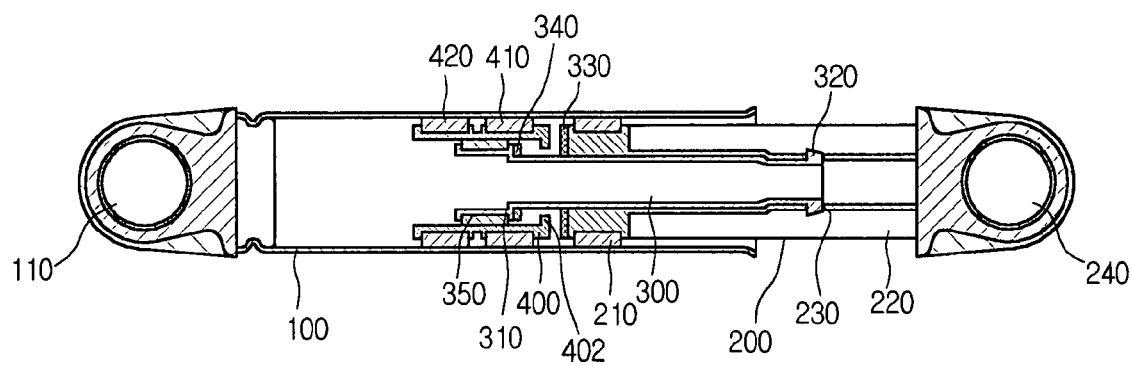
FIG. 24 is a sectional view of a damper for a washing machine according to a ninth embodiment of the present invention.

FIG. 24 illustrates a ninth embodiment of the present invention.

Referring to FIG. 24, a difference between the ninth embodiment and the eighth embodiment is that elastic members 330 and 340 are formed instead of the grease 390. Specifically, a second elastic member 340 is formed of an elastic material on the inner surface of the circumferential stopper 310, and a first elastic member 330 is formed of an elastic material on the left end portion of the piston body 200. The first and second elastic members 330 and 340 can be formed of a rubber material. In this manner, when the circumferential stopper 310 and the right end portion of the piston body 200 contact with the friction ring driving terminal 402, the impact force can be relieved by additionally forming the elastic members 330 and 340. Particularly, in case a buffering effect cannot be obtained through the grease 390 alone when a considerable amount of the impact force is applied to the contact surface of the friction ring driving terminal 402 due to a high speed rotation of the washing machine, the installation of the elastic members 330 and 340 is required especially.

Figure 25:
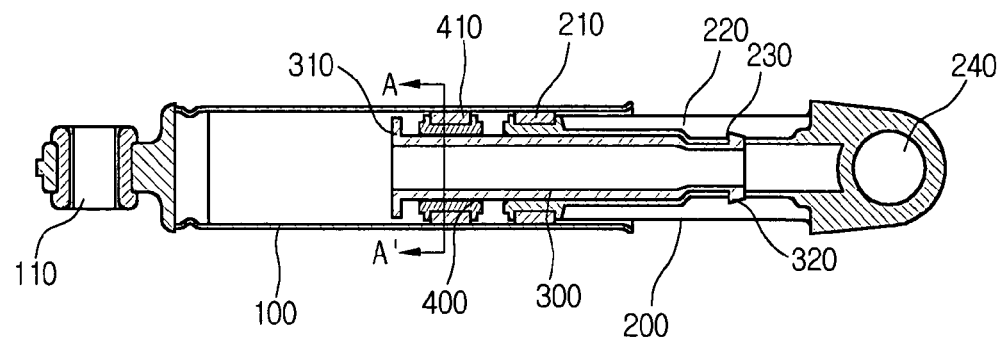
FIG. 25 is a sectional view of a damper for a washing machine according to a tenth embodiment of the present invention.
Figure 26:
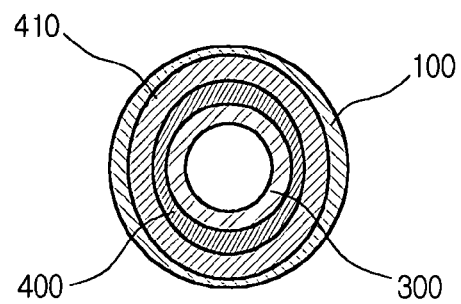
FIG. 26 is a sectional view taken along the line A-A' of FIG. 25.

FIGS. 25 and 26 illustrate a tenth embodiment of the present invention.

A structure of the damper for the washing machine according to the tenth embodiment of the present invention is mostly similar to that of the damper for the washing machine according to the first embodiment of the present invention. A difference is that a friction ring rotation preventing means is formed in order to prevent the rotation of the second friction member 410. If the friction ring 400 rotates, the second friction member 410 also rotates. At this time, the second friction member 410 provided with a porous plastic coated with a lubricant may be folded or protruded externally. If an original shape of the second friction member 410 is changed, an appropriate frictional coefficient is not reached on the contact surface between the second friction member 410 and the cylinder 100. Therefore, the function of the damper cannot be performed.

Accordingly, the friction ring rotation preventing means is formed in order to prevent the rotation of the friction ring 400, as shown in FIG. 26. FIG. 26 is a sectional view taken along the line A-A' of FIG. 25. Referring to FIG. 26, the damper according to the present invention includes a cylinder 100, a second friction member 410, a friction ring 400 and an extension bar 300. Specifically, the outer circumference of the friction ring 400 and the inner circumference of the cylinder 100 are formed in a non-circular shape, for example, in an elliptical shape as shown in FIG. 26. The second friction member 410 surrounding the outer circumference of the friction ring 400 is also formed in the elliptical shape. The second friction member 410 can be formed by inserting a rectangular porous plastic of elastic material, as described above. Therefore, without considering the shape at the formation of the second friction member 410, the second friction member 410 can be formed spontaneously in the elliptical shape while it is inserted into the outer circumference of the friction ring 400.

Since the outer circumference of the friction ring 400 and the inner circumference of the cylinder 100 are inserted in the elliptical shape in the above manner, an installation direction of the friction ring 400 can be placed at an original position as it is without any movement during the operation of the damper.

Since the installation direction of the friction ring 400 is fixed, it is possible to prevent in advance the second friction member 410 from being folded, which may be caused by the position movement of the friction ring 400 during the operation of the damper. Additionally, since the second friction member 410 is not folded, the frictional force occurring in the friction ring 400 can maintain the value given when the friction ring 400 is installed. As a result, the reliability can be maintained in the operation of the damper.

This embodiment can obtain a great effect in case the position of the second friction member 410 is greatly changed in a state of high speed rotation, in which an amount of vibration reaches 2000 Hz.

Figure 27:
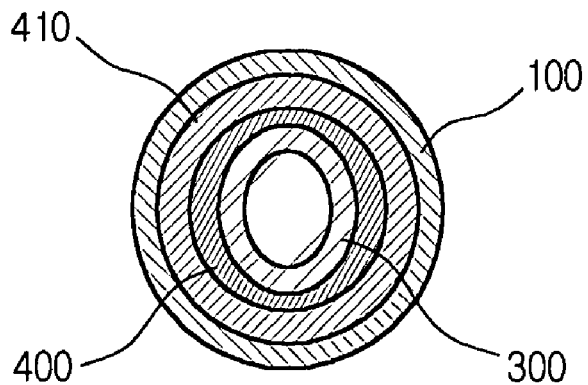
FIG. 27 is a sectional view of a damper for a washing machine according to an eleventh embodiment of the present invention.

FIG. 27 is a sectional view taken along the line A-A' of FIG. 25, showing a damper for a washing machine according to an eleventh embodiment of the present invention. A structure of the damper for the washing machine according to the eleventh embodiment of the present invention is mostly similar to that of the damper according to the tenth embodiment of the present invention. A difference is a structure of the friction ring rotation preventing means.

In the friction ring rotation preventing structure of the damper for the washing machine according to the eleventh embodiment of the present invention, the outer circumference of the extension bar 300 and the inner circumference of the friction ring 400 are formed in a non-circular shape, for example, in an elliptical shape as shown in FIG. 27, in order to prevent the rotation of the friction ring 400.

In this manner, the friction ring 400 is fixed only in an installation direction guided by the shape of the extension bar 300 and the friction ring 400 does not move the other directions. In other words, since the rotation of the friction ring 400 is prevented, the friction ring 400 is stopped at a position set in the installation and does not rotate.

Since an effect obtained by preventing the rotation of the friction ring 400 is identical to that of the tenth embodiment, its detailed description will be omitted.

Figure 28:
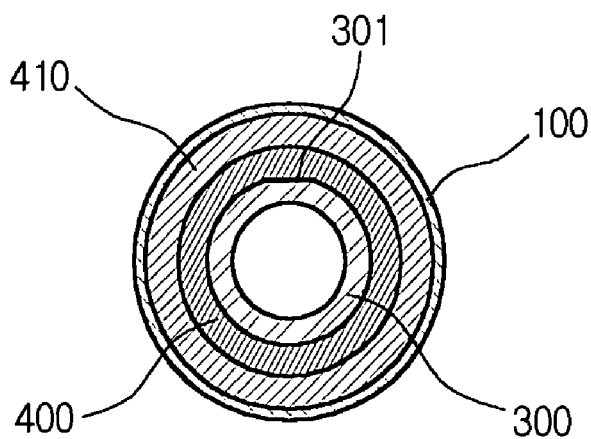
FIG. 28 is a sectional view taken along the line A-A' of FIG. 25 according to a twelfth embodiment of the present invention.

FIG. 28 is a sectional view taken along the line A-A' of FIG. 25, showing a damper for a washing machine according to a twelfth embodiment of the present invention. A structure of the damper for the washing machine according to the twelfth embodiment of the present invention is mostly similar to that of the damper according to the tenth embodiment of the present invention. A difference is a structure of the friction ring rotation preventing means.

Referring to FIG. 28, the friction ring rotation preventing structure of the damper for the washing machine according to the twelfth embodiment of the present invention includes a spline 301 formed between the inner circumferential surface of the friction ring 400 and the outer circumferential surface of the extension bar 300.

The spline 301 is characterized in that the rotation of the friction ring 400 can be prevented by forming a discontinuous portion at one side between the friction ring 400 and the extension bar 300.

Since an effect obtained by forming the spline 301 is identical to that of the tenth embodiment, its detailed description will be omitted.

Meanwhile, the spline 301 can be formed between the outer circumferential surface of the friction ring 400 and the inner circumferential surface of the cylinder 100. In other words, apart from the interposition of the second friction member 410 between the friction ring 400 and the cylinder 100, in case the spline 301 is formed at a predetermined position of the contact surface between the friction ring 400 and the cylinder 100, the rotation direction of the friction ring 400 can be fixed without movement, as described above.

Meanwhile, the spline 301 must be formed in a state that a predetermined interval between the extension bar 300 and the friction ring 400 is interposed. By doing so, the rotation direction of the friction ring 400 is not twisted. Further, due to the frictional force of the second friction member 410, the friction ring 400 can move back and forth together with the cylinder 100 without regard to the extension bar 300.

Figure 29:
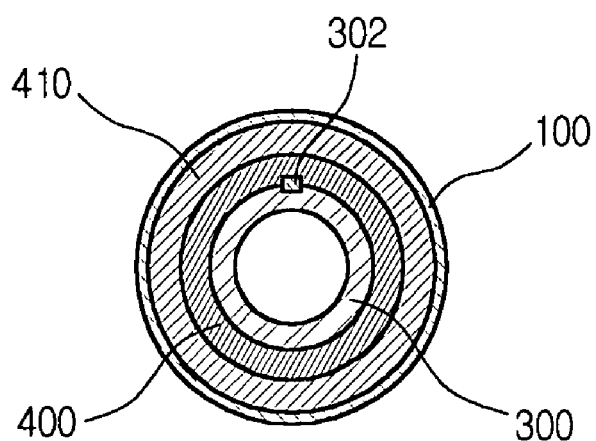
FIG. 29 is a sectional view taken along the line A-A' of FIG. 25 according to a thirteenth embodiment of the present invention.

FIG. 29 is a sectional view taken along the line A-A' of FIG. 25, showing a damper for a washing machine according to a thirteenth embodiment of the present invention. A structure of the damper for the washing machine according to the thirteenth embodiment of the present invention is mostly similar to that of the damper according to the twelfth embodiment of the present invention. A difference is a structure of the friction ring rotation preventing means.

Referring to FIG. 29, a fixing key 302 is formed between the inner circumferential surface of the friction ring 400 and the outer circumferential surface of the extension bar 300.

Since the fixing key 302 prevents the friction ring 400 from being rotated, a deformation of the second friction member 410 can be prevented. However, an interval between the extension bar 300 and the friction ring 400 must be formed so that the friction ring 400 cannot rotate in the rotation direction and can freely rotate the up and down direction (that is, the up and down direction of paper with respect to the drawing). Therefore, the fixing key 302 is not forceably inserted. Preferably, the fixing key 302 is formed on one side of the friction ring 400 and the extension bar 300 as one body, and a groove into which the fixing key 302 is inserted is formed on the other side.

Figure 30:
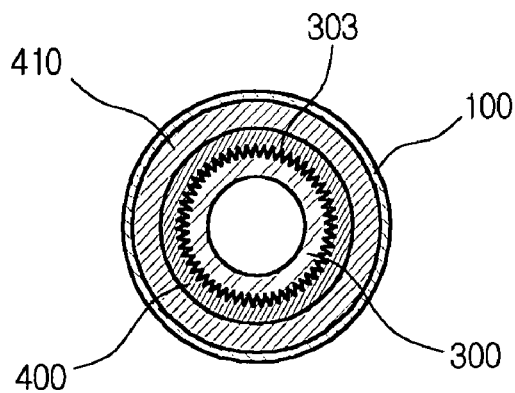
FIG. 30 is a sectional view taken along the line A-A' of FIG. 25 according to a fourteenth embodiment of the present invention.

FIG. 30 is a sectional view taken along the line A-A' of FIG. 25, showing a damper for a washing machine according to a fourteenth embodiment of the present invention. A structure of the damper for the washing machine according to the fourteenth embodiment of the present invention is mostly similar to that of the damper according to the thirteenth embodiment of the present invention. A difference is a structure of the friction ring rotation preventing means.

Referring to FIG. 30, a serration 303 is formed between the friction ring 400 and the extension bar 300. The serration 303 prevents the friction ring 400 from rotating freely, and the friction ring 400 can be fixed in the original installation direction.

Figure 31:
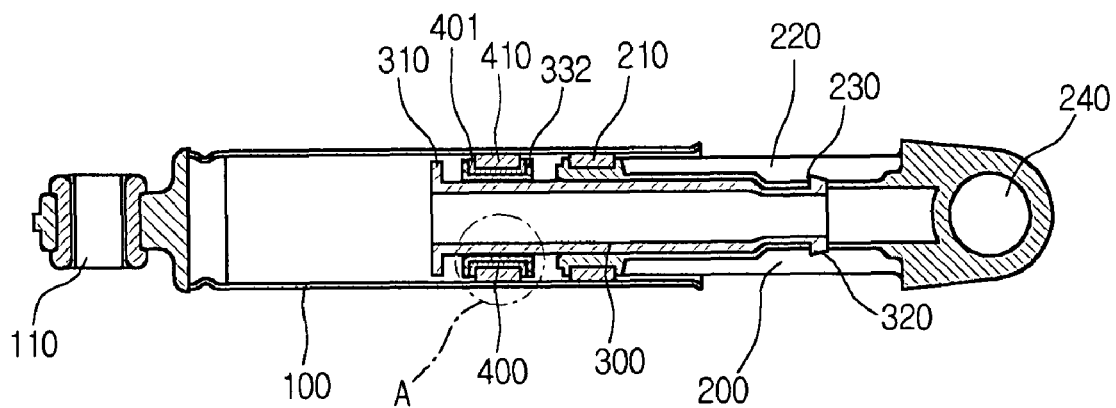
FIG. 31 is a sectional view of a damper for a washing machine according to a fifteenth embodiment of the present invention.
Figure 32:
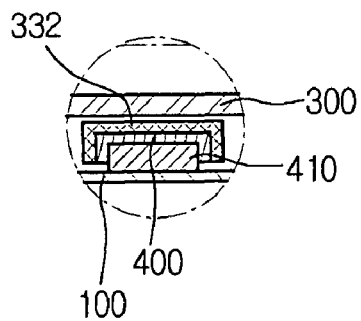
FIG. 32 is an enlarged view of the portion "A" of FIG. 31.

FIGS. 31 and 32 illustrate a fifteenth embodiment of the present invention.

FIG. 31 is a sectional view of the damper for the washing machine according to the fifteenth embodiment of the present invention. A structure of the damper for the washing machine according to the fifteenth embodiment of the present invention is mostly similar to that of the damper according to the first embodiment of the present invention. A difference is a structure of the friction ring 400 and the elastic member.

A third elastic member 332 is formed to surround at least the inner circumferential surface of the friction ring 400. It can be seen from the drawing that the third elastic member 332 surrounds the inner circumferential surface and both sides of the friction ring 400. In other words, the third elastic member 332 surrounding the inner circumferential surface and both sides of the friction ring 400 is formed as one body. This structure can eliminate an inconvenience of separately inserting two elastic members 330 and 340 like the first embodiment.

FIG. 32 is an enlarged view of the portion "A" of FIG. 31. As shown, the friction ring 400 can move regardless of the extension bar 300 when the third elastic member 332 and the outer circumferential surface of the extension 300 do not contact with each other. Therefore, a constant interval must be maintained between the third elastic member 350 and the extension bar 300.

The elastic member can be installed in simpler manufacturing process by forming the third elastic member 332 as one body to surround the inner circumferential surface and both sides of the friction ring 400, as shown in the drawing.

Figure 33:
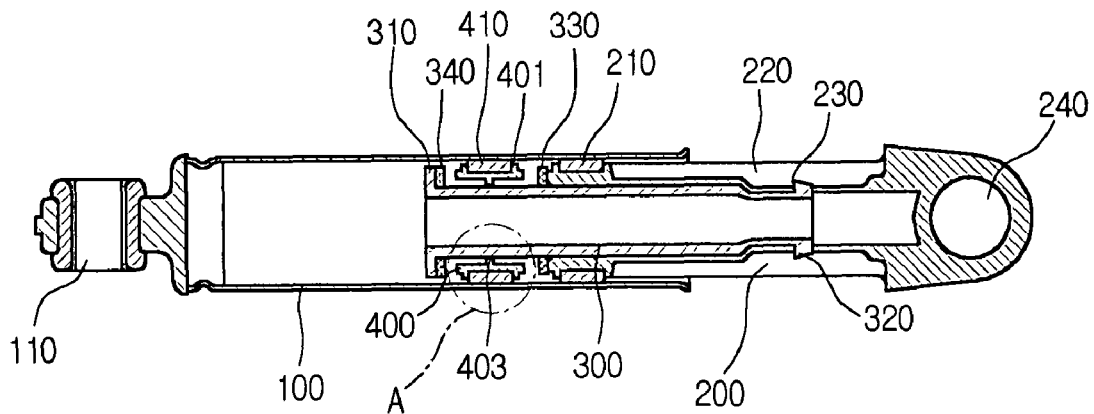
FIG. 33 is a sectional view of a damper for a washing machine according to a sixteenth embodiment of the present invention.
Figure 34:
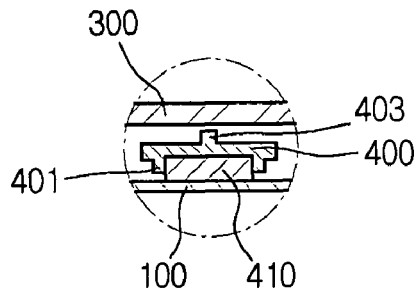
FIG. 34 is an enlarged view of the portion "A" of FIG. 33.

FIGS. 33 and 34 illustrate a sixteenth embodiment of the present invention.

FIG. 33 is a sectional view of the damper for the washing machine according to the sixteenth embodiment of the present invention. A structure of the damper for the washing machine according to the sixteenth embodiment of the present invention is mostly similar to that of the damper according to the fifteenth embodiment of the present invention. A difference is a structure of the friction ring 400 and the elastic member.

A reinforcement rib 403 is further formed on the inner circumferential surface of the friction ring 400 to reinforce the strength of the friction ring 400. The first and second elastic members 330 and 340 are formed in the same manner as the first embodiment. The impact force occurring during the operation of the damper can be buffered by making the elastic members contact with both sides of the friction ring 400.

Although this embodiment provides one reinforcement rib 403 formed on the inner circumferential surface of the friction ring 400, the strength of the friction ring 400 can also be increased in case two reinforcement ribs are formed on both sides of the friction ring 400 or in case two or more reinforcement ribs are formed on the entire inner circumferential surface of the friction ring 400.

FIG. 34 is an enlarged view of the portion "A" of FIG. 33. The principle operation of the friction ring 400 can be performed by spacing apart the reinforcement rib 403 and the extension bar 300 from each other by a predetermined distance.

Figure 35:
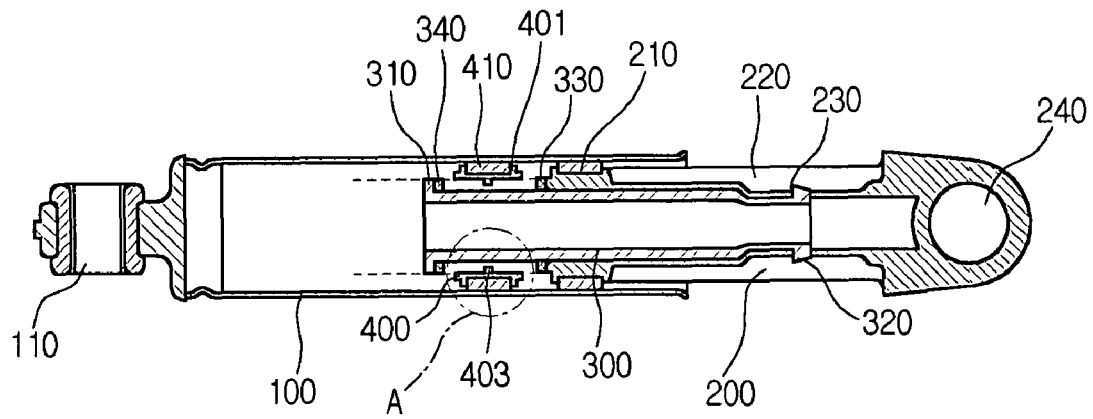
FIG. 35 is a sectional view of a damper for a washing machine according to a seventeenth embodiment of the present invention.
Figure 36:
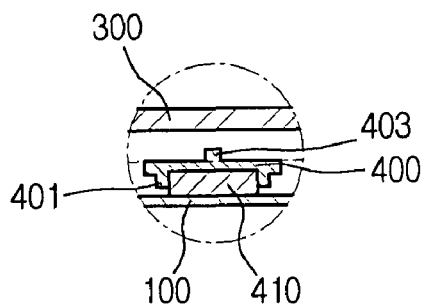
FIG. 36 is an enlarged view of the portion "A" of FIG. 35.

FIGS. 35 and 36 illustrate a seventeenth embodiment of the present invention.

FIG. 35 is a sectional view of the damper for the washing machine according to the seventeenth embodiment of the present invention. A structure of the damper for the washing machine according to the seventeenth embodiment of the present invention is mostly similar to that of the damper according to the sixteenth embodiment of the present invention. A difference is a structure of the friction ring 400 and the elastic member.

Unlike the sixteenth embodiment, diameters of the circumferential stopper 310 and the end portion of the piston body 200 are reduced. The first elastic member 330 is formed on the outer surface of the piston body 200 and the second elastic member 340 is formed on the inner surface of the circumferential stopper 310. Each diameter of the circumferential stopper 310 and the piston body 200 are smaller than that of the end portion of the friction ring 400. Therefore, the circumferential stopper 310 and the piston body 200 can pass the both sides of the friction ring 400 and move inwardly much more. An imaginary line represents such a height difference.

The circumferential stopper 310 and the piston body 200 entered inwardly through the end portion of the friction ring 400 contact with both sides of the reinforcement rib 403, thus allowing the friction ring 400 to be moved.

Therefore, a period during which a small damping force can be applied is lengthened by a length between the end portion of the friction ring 400 and the end portion of the reinforcement rib 403. Further, since the contact portion of the friction ring 400 becomes the reinforcement rib 402, the friction ring 400 can move in more stable state.

FIG. 36 is an enlarged view of the portion "A" of FIG. 35. The principle operation of the friction ring 400 can be performed by spacing apart the reinforcement rib 403 and the extension bar 300 from each other by a predetermined distance.

Figure 37:
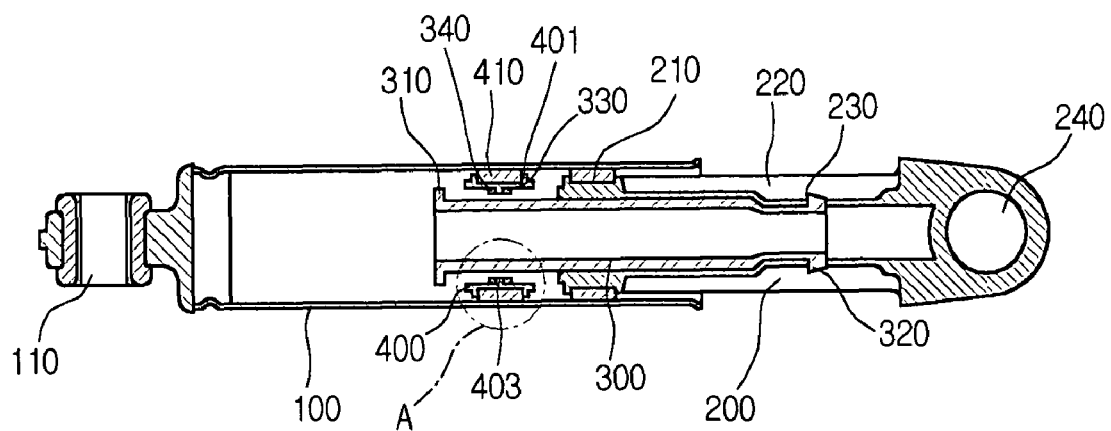
FIG. 37 is a sectional view of a damper for a washing machine according to an eighteenth embodiment of the present invention.
Figure 38:
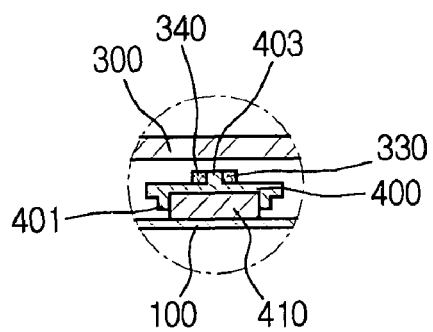
FIG. 38 is an enlarged view of the portion "A" of FIG. 37.

FIGS. 37 and 38 illustrate an eighteenth embodiment of the present invention.

FIG. 37 is a sectional view of the damper for the washing machine according to the eighteenth embodiment of the present invention. A structure of the damper for the washing machine according to the eighteenth embodiment of the present invention is mostly similar to that of the damper according to the seventeenth embodiment of the present invention. A difference is a topology and a forming position of the elastic member.

Specifically, as an impact relieving means, the elastic members 330 and 340 are formed on both sides of the reinforcement rib 403, not on the inner surface of the circumferential stopper 310 and the end portion of the piston body 200.

A convenience in the installation of the elastic members 330 and 340 is enhanced much more by forming the elastic members 330 and 340 on both sides of the reinforcement rib 403. Further, the same effect of the impact relief can be obtained.

FIG. 38 is an enlarged view of the portion "A" of FIG. 37. The fundamental operation of the friction ring 400 can be performed by spacing apart the reinforcement rib 403 and the elastic members 330 and 340 from the extension bar 300 by a predetermined distance.

Figure 39:
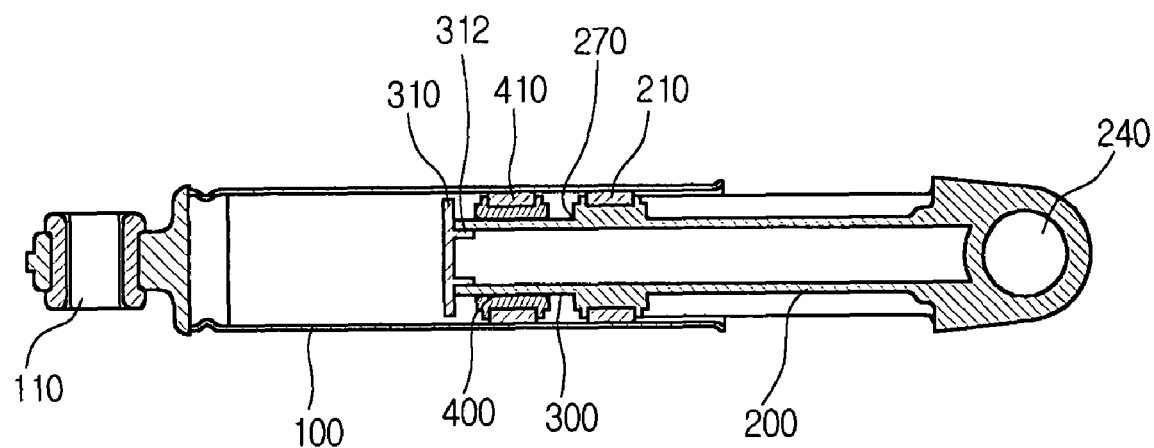
FIG. 39 is a sectional view of a damper for a washing machine according to a nineteenth embodiment of the present invention.
Figure 40:
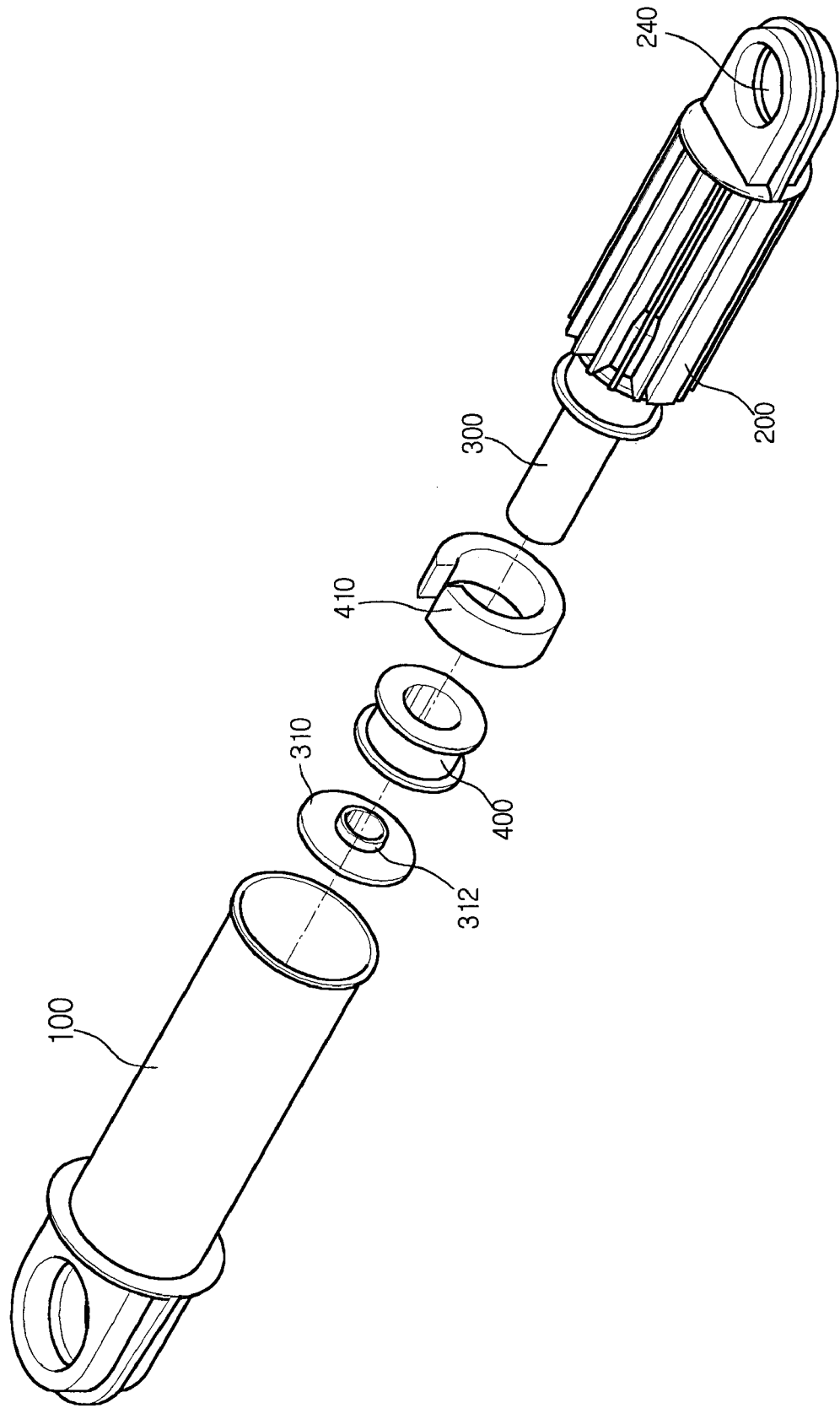
FIG. 40 is an exploded perspective view of a damper for a washing machine according to a nineteenth embodiment of the present invention.
Figure 41:
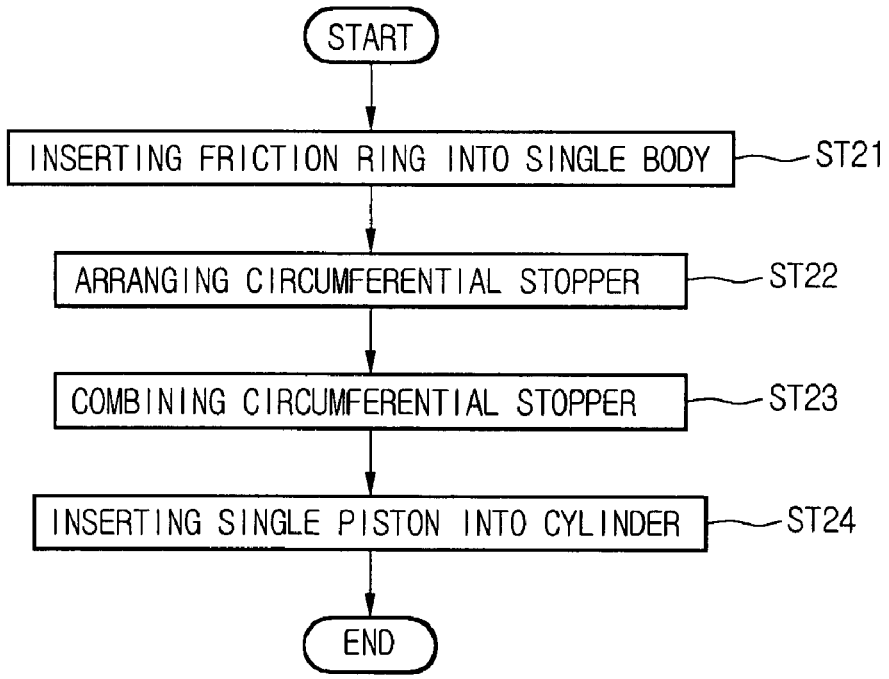
FIG. 41 is a flowchart showing a method for forming a damper for a washing machine according to the nineteenth embodiment of the present invention.

FIGS. 39 to 41 illustrate a nineteenth embodiment of the present invention.

A structure of the damper for the washing machine according to the nineteenth embodiment of the present invention is mostly similar to that of the damper according to the first embodiment of the present invention. A difference is a connecting method of the piston body 300 and the extension bar 200.

FIG. 39 is a sectional view of the damper for the washing machine according to the nineteenth embodiment of the present invention.

Referring to FIG. 39, the damper for the washing machine according to the nineteenth embodiment of the present invention includes a cylinder 100, a piston body 200, an extension 300, a friction ring 400, a tub fixing opening 110, a case fixing opening 240, a first friction member 210, a second friction member 410, and a circumferential stopper 310, which are similar to the first embodiment of the present invention. However, in this embodiment, the extension bar 300 and the piston body 200 is formed as one body. Specifically, the extension bar 300 and the piston body 200 can be formed as one body by an injection molding. The circumferential stopper 310 is a separate element and can be connected to the circumferential surface of the extension bar 300 by means of a connection rib 312 formed protrudedly on one side of the circumferential stopper 310.

Further, the friction ring 400 is pushed by the circumferential stopper 310 and the end portion of the piston body 200 in a state that the friction ring 400 is disposed in the central portion, thereby performing the multi-step operation of the damper according to the present invention. Except for that, a change of the damping force caused by the damper is identical to that of the first embodiment.

FIG. 40 is an exploded perspective view of the damper for the washing machine according to the nineteenth embodiment of the present invention.

Referring to FIG. 40, as described above, the damper according to the present invention includes the cylinder 100, the friction ring 400, the piston body 200, and the extension bar 300. Specifically, the piston body 200 and the extension bar 300 are formed as one body at the beginning of the manufacture.

After the respective elements are disposed at their predetermined positions, the connection rib 312 formed protrudedly on one surface of the circumferential stopper 310 can be fused on the inner circumferential surface of the end portion of the extension bar 300. In addition to the fusion of the circumferential stopper 310, the connection rib 312 can be connected in other manner, such as bonding. Meanwhile, although the drawing shows the circumferential stopper 310 fused on the inner circumferential surface of the extension bar 300, the circumferential stopper 310 can be practically fused on the outer circumferential surface of the extension bar 300.

This embodiment can obtain a convenience in the manufacture by forming a single piston, that is, by forming the piston body 200 and the extension bar 300 as one body.

FIG. 41 is a flowchart illustrating a method for coupling the damper for the washing machine according to the nineteenth embodiment of the present invention.

Referring to FIG. 41, according to the damper of the present invention, the friction ring 400 is inserted into the single piston provided by forming the piston body 200 and the extension bar 300 as one body (ST21). In more detail, the friction ring 400 is formed spaced apart from the outer circumference of the extension bar 300 by a predetermined distance.

The circumferential stopper 310 is arranged in the end portion of the extension bar 300 (ST22). The contact surface between the circumferential stopper 310 and the extension bar 300 is fused or bonded to connect the circumferential stopper 310 and the extension bar 310 (ST23). The process of manufacturing the damper is completed by inserting the single piston into the cylinder 100, in which the friction ring 400 is inserted into the single piston (ST24).

Further, the friction members 210 and 410 formed on the friction ring 400 and the outer circumference of the piston body 200 is formed surrounded around the friction ring 400 and the outer circumference of the piston body 200 before the single piston is inserted into the cylinder 100. For this, the friction members 210 and 410 are provided by coating the porous plastic of the elastic material with a lubricant, as described above. In view of its topology, a rectangular plastic is surrounded at the described-above position.

Meanwhile, the friction ring 400 disposed at the outer circumference of the extension bar 300 can be rotated only between the circumferential stopper 310 and the stepped portion 270. Therefore, when the cylinder 100 moves back and forth, the friction ring 400 also moves back and forth together with the cylinder 100. However, the friction ring 400 moves in a range between the circumferential stopper 310 and the stepped portion. If the cylinder 100 moves back and forth over a predetermined length, the friction ring 400 is pushed by means of the circumferential stopper 310 and the stepped portion 270, thereby generating a larger damping force.

As described above, according to the nineteenth embodiment of the present invention, the multi-step damper for the washing machine can be manufactured more easily.

Figure 42:
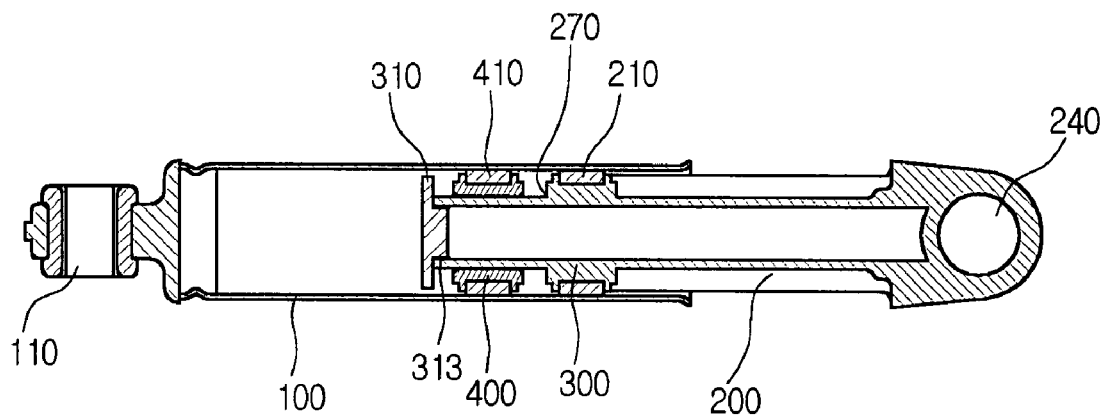
FIG. 42 is a sectional view of a damper for a washing machine according to a twentieth embodiment of the present invention.

FIG. 42 is a sectional view of a damper for a washing machine according to a twentieth embodiment of the present invention.

Referring to FIG. 42, a structure of the damper for the washing machine according to the twentieth embodiment of the present invention is mostly similar to that of the damper according to the nineteenth embodiment of the present invention. A difference is that a connection protrusion 313 is formed instead of the connection rib 312. Like this, the molding process of the circumferential stopper 310 can be achieved more easily by protrudedly forming the connection protrusion 313 on one end of the circumferential stopper 310 instead of the connection rib 312.

The connection protrusion 313 is not limited to a circular shape shown in the drawing, the connection protrusion 313 can be provided in a shape given by recessing an outer circumference of some portion to protrude the other portion, a triangular shape, a rectangular shape, and the like.

INDUSTRIAL APPLICABILITY

In the damper for the washing machine according to the present invention, an appropriate damping force is applied differently according to the case a large amount of vibration occurs and the case a small amount of vibration occurs during the operation of the damper, thereby rapidly reducing the amount of vibration occurring in the washing machine.

In addition, since the vibration is rapidly attenuated by applying an appropriate damping force according to an amount of vibration, an amount of noise occurring due to the collision between parts of the washing machine during the vibration can be reduced, thereby enhancing a good condition in the use of the washing machine.

Further, in case a displacement of the damper is large due to a strong vibration, the breakage and damage of the damper can be prevented.

The invention claimed is:

1. A damper for a washing machine, comprising:
   a cylinder, the cylinder including:
      a first end portion; and
      a second end portion having a tub fixing opening;
   a piston body, the piston body including:
      a first end portion inserted into the cylinder; and
      a second end portion having a case fixing opening;
   a first friction member disposed in a contact surface between the piston body and the cylinder;
   an extension bar inserted into the first end portion of the piston body, the extension bar including:
      one end portion coupled to the piston body; and
      the other end portion having a circumferential stopper, the other end portion of the extension bar extending such that the circumferential stopper is placed away from the first end portion of the piston body;
   a friction ring inserted into the cylinder, the friction ring having:
      a first end which is closer to the tub fixing opening; and
      a second end which is closer to the case fixing opening, the second end of the friction ring including a friction ring driving terminal, the friction ring driving terminal selectively contacting the circumferential stopper; and
      a second friction member formed on an outer circumferential surface of the friction ring to contact with an inner surface of the cylinder,
   wherein the circumferential stopper is disposed inside the friction ring and moves between the first end and the second end of the friction ring.

2. The damper for the washing machine according to claim 1, wherein the friction ring driving terminal selectively contacts the first end portion of the piston body.

3. The damper for the washing machine according to claim 1, further comprising a viscous fluid adhered to a surrounding of the friction ring driving terminal.

4. The damper for the washing machine according to claim 1, further comprising a grease adhered to an adjacent portion of the friction ring to relieve an impact force during an operation.

5. The damper for the washing machine according to claim 1, wherein when the circumferential stopper of the extension bar is caught by the friction ring driving terminal of the friction ring, the first end of the friction ring is placed farthest from the circumferential stopper.

6. The damper for the washing machine according to claim 5, wherein the friction ring driving terminal is configured to move between the circumferential stopper and the first end portion of the piston body.

* * * * *